US012573124B2

(12) United States Patent
Cowburn et al.

(10) Patent No.: US 12,573,124 B2
(45) Date of Patent: Mar. 10, 2026

(54) PROGRESSIVE REAL-TIME DIFFUSION OF LAYERED CONTENT FILES WITH ANIMATED FEATURES

(71) Applicant: FIGMA, INC., San Francisco, CA (US)

(72) Inventors: Piers Cowburn, London (GB); Djan Belli, London (GB); Martin Kristiansen, New York, NY (US)

(73) Assignee: Figma, Inc., San Francisco, CA (US)

( * ) Notice: Subject to any disclaimer, the term of this patent is extended or adjusted under 35 U.S.C. 154(b) by 164 days.

(21) Appl. No.: 18/617,535

(22) Filed: Mar. 26, 2024

(65) Prior Publication Data

US 2025/0308124 A1 Oct. 2, 2025

(51) Int. Cl.
*G06T 13/80* (2011.01)
*G06T 7/20* (2017.01)
*G06T 11/60* (2006.01)

(52) U.S. Cl.
CPC ................ *G06T 13/80* (2013.01); *G06T 7/20* (2013.01); *G06T 11/60* (2013.01)

(58) Field of Classification Search
CPC ............ G06T 13/80; G06T 7/20; G06T 11/60
See application file for complete search history.

(56) References Cited

U.S. PATENT DOCUMENTS

| | | | |
|---|---|---|---|
| 2016/0071544 A1* | 3/2016 | Waterston ............ | G11B 27/034 |
| | | | 386/278 |
| 2019/0004791 A1* | 1/2019 | Brebner .................... | G06F 8/76 |
| 2019/0172243 A1* | 6/2019 | Mishra .................. | G10L 15/005 |
| 2021/0248727 A1* | 8/2021 | Fisher .................... | G06N 3/088 |
| 2024/0169630 A1* | 5/2024 | Kim ...................... | G06F 3/0481 |

OTHER PUBLICATIONS

Mikami, Koji, "Diorama engine—a 3D directing tool for 3D computer animation production," Jul. 2003, Proceedings Computer Graphics International 2003, pp. 318-323 (Year: 2003).*
DiLorenzo, Paul Carmen, "Premo: DreamWorks Animation's New Approach to Animation," Jul. 2015, IEEE Computer Graphics and Applications, vol. 35, No. 4, pp. 14-21 (Year: 2015).*
Schenk, Christian, "Interoperable Access to Video Content as a Basis for Collaborative Video Editing," Mar. 2017, International Conference on Collaboration Technologies and Systems (CTS), pp. 233-240, (Year: 2017).*

* cited by examiner

*Primary Examiner* — Terrell M Robinson
(74) *Attorney, Agent, or Firm* — Squire Patton Boggs LLP; Sarah Mirza

(57) ABSTRACT

Systems or methods for providing a content editing service that integrates a layered structure of digital image editing integrated with AI-based image-guided content generation modifier that is guided based on different features stored in association with the separate layers of the layered structure. The image-guided content generation utilizes a non-destructive nature of the layer-based image editing process to extract metadata associated with input layers of a provided image to output computer-generated content.

20 Claims, 13 Drawing Sheets

Figure 3:
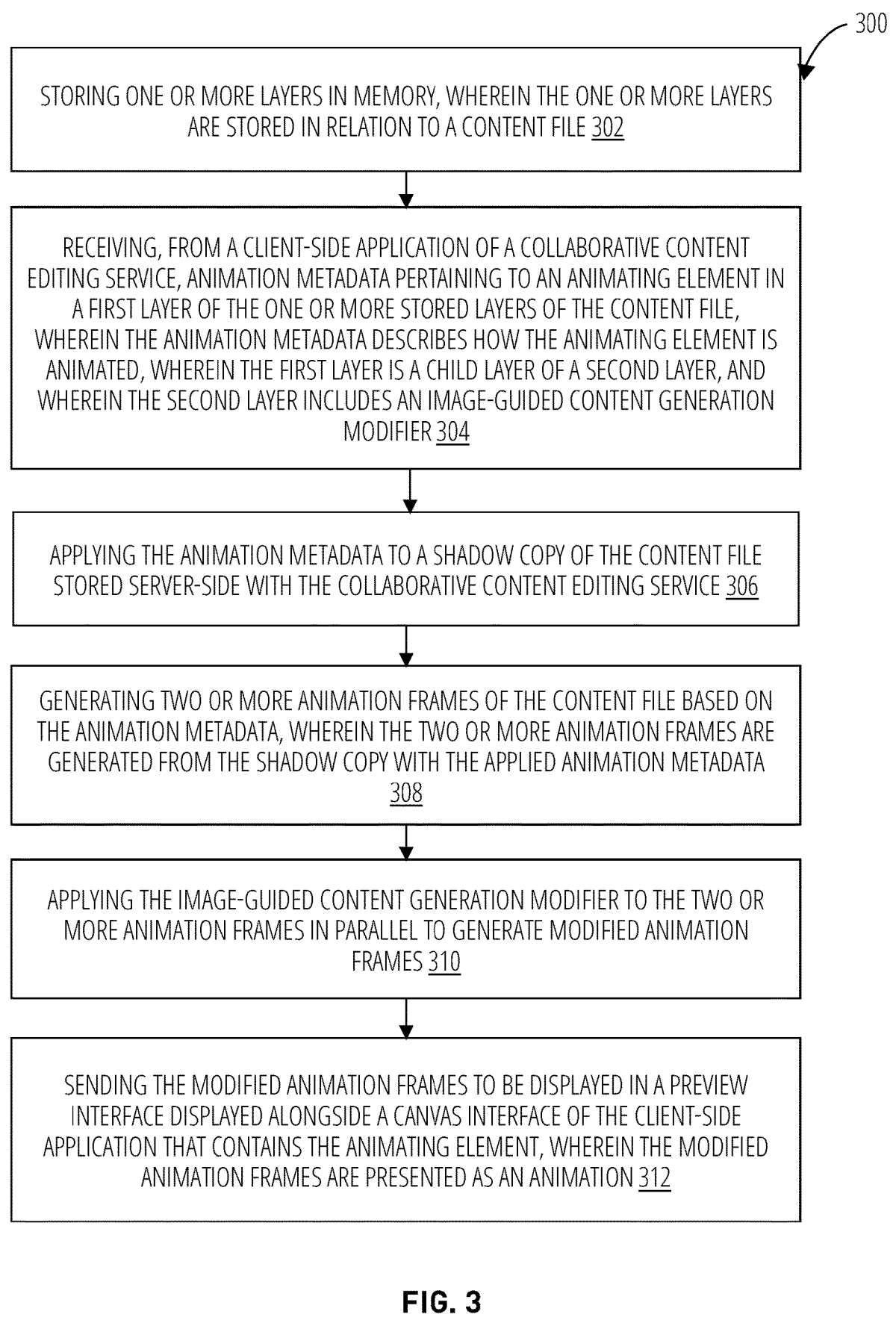

300

STORING ONE OR MORE LAYERS IN MEMORY, WHEREIN THE ONE OR MORE LAYERS ARE STORED IN RELATION TO A CONTENT FILE 302

RECEIVING, FROM A CLIENT-SIDE APPLICATION OF A COLLABORATIVE CONTENT EDITING SERVICE, ANIMATION METADATA PERTAINING TO AN ANIMATING ELEMENT IN A FIRST LAYER OF THE ONE OR MORE STORED LAYERS OF THE CONTENT FILE, WHEREIN THE ANIMATION METADATA DESCRIBES HOW THE ANIMATING ELEMENT IS ANIMATED, WHEREIN THE FIRST LAYER IS A CHILD LAYER OF A SECOND LAYER, AND WHEREIN THE SECOND LAYER INCLUDES AN IMAGE-GUIDED CONTENT GENERATION MODIFIER 304

APPLYING THE ANIMATION METADATA TO A SHADOW COPY OF THE CONTENT FILE STORED SERVER-SIDE WITH THE COLLABORATIVE CONTENT EDITING SERVICE 306

GENERATING TWO OR MORE ANIMATION FRAMES OF THE CONTENT FILE BASED ON THE ANIMATION METADATA, WHEREIN THE TWO OR MORE ANIMATION FRAMES ARE GENERATED FROM THE SHADOW COPY WITH THE APPLIED ANIMATION METADATA 308

APPLYING THE IMAGE-GUIDED CONTENT GENERATION MODIFIER TO THE TWO OR MORE ANIMATION FRAMES IN PARALLEL TO GENERATE MODIFIED ANIMATION FRAMES 310

SENDING THE MODIFIED ANIMATION FRAMES TO BE DISPLAYED IN A PREVIEW INTERFACE DISPLAYED ALONGSIDE A CANVAS INTERFACE OF THE CLIENT-SIDE APPLICATION THAT CONTAINS THE ANIMATING ELEMENT, WHEREIN THE MODIFIED ANIMATION FRAMES ARE PRESENTED AS AN ANIMATION 312

Figure 4:
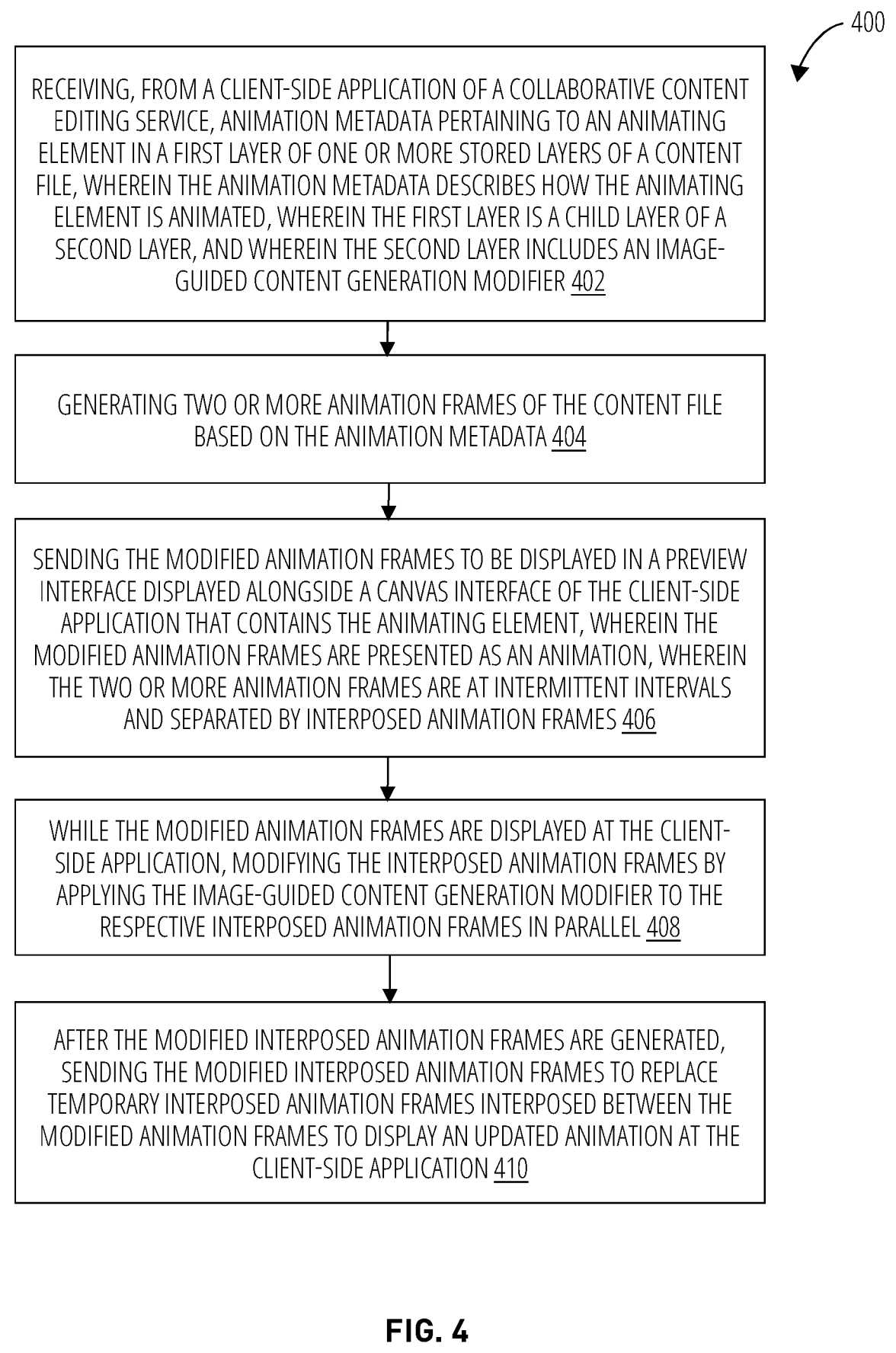

RECEIVING, FROM A CLIENT-SIDE APPLICATION OF A COLLABORATIVE CONTENT EDITING SERVICE, ANIMATION METADATA PERTAINING TO AN ANIMATING ELEMENT IN A FIRST LAYER OF ONE OR MORE STORED LAYERS OF A CONTENT FILE, WHEREIN THE ANIMATION METADATA DESCRIBES HOW THE ANIMATING ELEMENT IS ANIMATED, WHEREIN THE FIRST LAYER IS A CHILD LAYER OF A SECOND LAYER, AND WHEREIN THE SECOND LAYER INCLUDES AN IMAGE-GUIDED CONTENT GENERATION MODIFIER 402

GENERATING TWO OR MORE ANIMATION FRAMES OF THE CONTENT FILE BASED ON THE ANIMATION METADATA 404

SENDING THE MODIFIED ANIMATION FRAMES TO BE DISPLAYED IN A PREVIEW INTERFACE DISPLAYED ALONGSIDE A CANVAS INTERFACE OF THE CLIENT-SIDE APPLICATION THAT CONTAINS THE ANIMATING ELEMENT, WHEREIN THE MODIFIED ANIMATION FRAMES ARE PRESENTED AS AN ANIMATION, WHEREIN THE TWO OR MORE ANIMATION FRAMES ARE AT INTERMITTENT INTERVALS AND SEPARATED BY INTERPOSED ANIMATION FRAMES 406

WHILE THE MODIFIED ANIMATION FRAMES ARE DISPLAYED AT THE CLIENT-SIDE APPLICATION, MODIFYING THE INTERPOSED ANIMATION FRAMES BY APPLYING THE IMAGE-GUIDED CONTENT GENERATION MODIFIER TO THE RESPECTIVE INTERPOSED ANIMATION FRAMES IN PARALLEL 408

AFTER THE MODIFIED INTERPOSED ANIMATION FRAMES ARE GENERATED, SENDING THE MODIFIED INTERPOSED ANIMATION FRAMES TO REPLACE TEMPORARY INTERPOSED ANIMATION FRAMES INTERPOSED BETWEEN THE MODIFIED ANIMATION FRAMES TO DISPLAY AN UPDATED ANIMATION AT THE CLIENT-SIDE APPLICATION 410

PROGRESSIVE REAL-TIME DIFFUSION OF LAYERED CONTENT FILES WITH ANIMATED FEATURES

FIELD OF THE DISCLOSURE

The present disclosure is generally related to a system for progressive real-time diffusion of layered content files with animated features for a content editing service.

BACKGROUND

In the realm of digital video editing, software applications have offered an array of tools for creative manipulation. However, in generating diffusion-based video animation, generally, the output is generated from an inputted prompt or an inputted video. As such, the output is limited to such inputs. Therefore, editing the output with limited inputs results in a lack of flexibility for generating revisions, cumbersome version control, as well as difficulties in collaborative work. Recognizing these shortcomings, this patent addresses the need for more efficient, non-destructive video editing tools, aiming to revolutionize the field and provide users with comprehensive options for preserving video quality while enabling versatile digital video manipulation.

BRIEF SUMMARY

In one aspect, a computer-implemented method includes storing one or more layers in memory, where the one or more layers are stored in relation to a content file, receiving, from a client application of a collaborative content editing service, animation metadata pertaining to an animating element in a first layer of the one or more stored layers of the content file, where the animation metadata describes how the animating element is animated, where the first layer is a child layer of a second layer, and where the second layer includes an image-guided content generation modifier, generating two or more animation frames of the content file based on the animation metadata, applying the image-guided content generation modifier to the two or more animation frames in parallel to generate modified animation frames, and sending the modified animation frames to be displayed in a preview interface displayed alongside a canvas interface of the client application that contains the animating element, where the modified animation frames are presented as an animation.

The computer-implemented method may also include where the modified animation frames are displayed as a continuous loop through the modified animation frames over a period of time. The computer-implemented method may also include where the two or more animation frames are at intermittent intervals and separated by interposed animation frames. The computer-implemented method may also further include modifying the interposed animation frames by applying the image-guided content generation modifier to the respective interposed animation frames in parallel while the modified animation frames are displayed at the client application, and after the modified interposed animation frames are generated, sending the modified interposed animation frames to replace temporary interposed animation frames interposed between the modified animation frames to display an updated animation at the client application.

The computer-implemented method may also further include using the animation metadata or the two or more animation frames to generate optical flow vectors, and using the optical flow vectors to generate the temporary interposed animation frames. The computer-implemented method may also further include determining, based on the optical flow vectors, one or more regions in the two or more animation frames that do not have animation, and sending instructions to hold the regions in memory of a first modified animation frame throughout the animation. The computer-implemented method may also further include determining, based on the optical flow vectors, one or more regions in the two or more animation frames that do not have animation, and generating a masked region of the respective animation frames that excludes the one or more regions, where the applying of the image-guided content generation modifier is to the masked region of the respective animation frames.

In one aspect, the computer-implemented method may include where the masked region is generated by using at least one of a transparency matte of the respective animation frames or an automatic image segmentation technique of the respective animation frames to automatically generate the masked region. The computer-implemented method may also include where the two or more animation frames are at intermittent intervals and separated by interposed animation frames, and where the generation of at least some of the two or more animation frames further includes encoding animation data in pixels of the at least some of the two or more animation frames. The animation data may include optical flow vectors, or other encoded data, generated based on the animation metadata. The encoded animation data may be sent to the client application that uses the encoded animation data to create temporary interposed animation frames interposed between the modified animation frames for display in the animation while modified interposed animation frames are being generated. In some cases, the encoded animation data may create the temporary interposed animation frames at the server-side collaborative content editing service.

The computer-implemented method may also further include applying the animation metadata to a shadow copy of the content file, where the two or more animation frames are generated from the shadow copy with the applied animation metadata. In some cases, the shadow copy may be stored with a collaboration service for real-time state synchronization. In some cases, the collaboration service may be stored at a remote server or at a client device. The computer-implemented method may also include where metadata of the one or more layers guides the image-guided content generation modifier to boost a control strength of one or more contours contiguous with a respective transparent background of the two or more animation frames. The computer-implemented method may also include where the modified animation frames include a set of output layers corresponding to the one or more layers. The computer-implemented method may also include where the contextual data includes optical flow vector data that provides context to movement of one or more features of the two or more animation frames.

In one aspect, a computing device includes one or more processors. The computing device also includes memory storing instructions that, when executed by the one or more processors, configure the computing device to store one or more layers in memory, where the one or more layers are stored in relation to a content file, receive, from a client application of a collaborative content editing service, animation metadata pertaining to an animating element in a first layer of the one or more stored layers of the content file, where the animation metadata describes how the animating element is animated, where the first layer is a child layer of a second layer, and where the second layer includes an image-guided content generation modifier, generate two or more animation frames of the content file based on the animation metadata, apply the image-guided content generation modifier to the two or more animation frames in parallel to generate modified animation frames, and send the modified animation frames to be displayed in a preview interface displayed alongside a canvas interface of the client application that contains the animating element, where the modified animation frames are presented as an animation.

In one aspect, a non-transitory computer-readable storage medium, the computer-readable storage medium including instructions that when executed by a computer, cause the computer to store one or more layers in memory, where the one or more layers are stored in relation to a content file, receive, from a client application of a collaborative content editing service, animation metadata pertaining to an animating element in a first layer of the one or more stored layers of the content file, where the animation metadata describes how the animating element is animated, where the first layer is a child layer of a second layer, and where the second layer includes an image-guided content generation modifier, generate two or more animation frames of the content file based on the animation metadata, apply the image-guided content generation modifier to the two or more animation frames in parallel to generate modified animation frames, and send the modified animation frames to be displayed in a preview interface displayed alongside a canvas interface of the client application that contains the animating element, where the modified animation frames are presented as an animation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates an example method for animation generation based on a layered image structure and use of a shadow copy with an image-guided content generation modifier in accordance with some aspects of the present technology.

FIG. 4 illustrates an example method for animation generation based on a layered image structure and use of temporary interposed animation frames in accordance with some aspects of the present technology.

DETAILED DESCRIPTION

Figure 1:
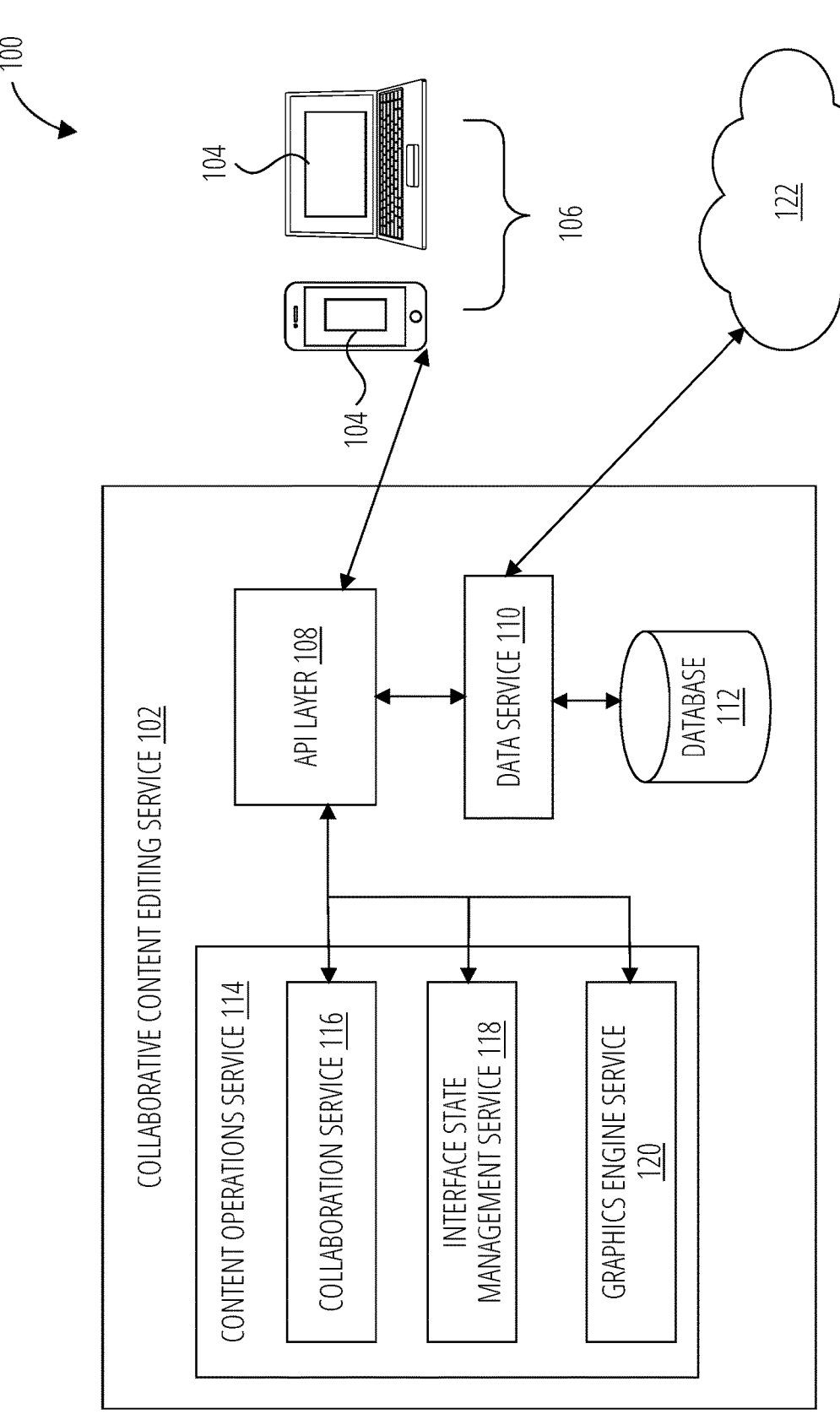
FIG. 1 illustrates an example system configured to support user accounts in creating and managing collaborative content files in accordance with some aspects of the present technology.

Digital video editing tools and artificial intelligence-based (AI-based) video generation platforms have historically been separate and distinct tools and non-collaborative. For the more recent tools that do combine some basic features, such integration is fundamentally limited. A collaborative content editing service of the present technology integrates a layered structure of collaborative digital video editing integrated with AI-based image-guided content generation for the various frames that is guided based on different features stored in association with the separate layers of the layered structure.

More specifically, the collaborative content editing service integrates the metadata associated with the layers of the layered structure of a collaborative digital video editing service with an AI-based image-guided content generation modifier that is guided based on different features stored in association with the separate layers. One or more of the features may be animated, resulting in an animated output. The image-guided content generation modifier may be a specific type of modifier that uses a provided set of one or more input layers as guidance for generating a computer-generated content, such as animation. The input layer may be selected layers that are used as guidance for modifiers such as the image-guided content generation modifier. Each separate layer is a stackable, nestable container for content added to a canvas interface, a graphical interface on a client device where the user manipulates and edits visual aspects of the content file.

Modifiers, such as the image-guided content generation modifier, may be used to provide a variety of non-destructive editing protocols that process image data and are arranged as pipelines. More than one modifier may be used for a content file and the output of a previous modifier in the pipeline may be taken as processed to derive some output which is then either passed to the next modifier in the pipeline or rendered to the screen.

Such integrations provide users with compositional control of how the different features are reflected in outputted computer-generated content. The computer-generated content may be a computer-generated output of a modifier such as an image-guided content generation modifier. The computer-generated content may be an image, a three-dimensional digital object or scene, a set of images, an animation, etc.

As such, the image-guided content generation of the present technology utilizes a non-destructive nature of the layer-based image editing process to extract metadata associated with input layers of a provided image to output the computer-generated content. In some cases, text prompts may also be used to further guide the image-guided content generation modifier to add specific objects, themes, or styles. Furthermore, the image-guided content generation modifier may initialize the generation of the computer-generated content based on a random seed or a user-selected seed that serves as a starting point of the image-guided content generation modifier process.

When requested, the image-guided content generation modifier may perform image generation based on contour-based guidance from the provided input layers. Contour-based guidance may be a type of image-based guidance used by an image-guided content generation modifier to generate the computer-generated content. In some cases, contour-based guidance may leverage a neural network structure that controls one or more diffusion models based on different conditions set for different objects of the input layers.

For contour-based guidance for image generation in existing technology, the limitation stems from having a control strength value that serves as a strength of the guidance, based on a single floating point value that is applied uniformly across the entire surface of the image. The drawback to this approach is that different areas of a user's design are likely to vary in terms of their significance or the extent to which the precision of their contours matter in the final generated image. For example, for areas where the user has added typography to their design, it is likely to be very important that the generated image pays close attention to the contours of the typography in order for the text to be legible. Conversely, for other areas of the image, the user may want to provide more low-fidelity/gestural guidance in terms of the layout or 'feel' they want to achieve in that area. As such, such a user may be looking for some freedom for how certain contours of certain objects are taken into consideration in creating the computer-generated content.

In the present technology, because of its layered structure, the image-guided content generation modifier receives metadata that reveals different features for the different objects of an image. For example, the layered structure allows for the creation of separate layers for text objects, brush strokes, images, transparent background images, etc. As such, because of the additional metadata, control strength values for different features and/or objects may be tailored based on the metadata that distinguishes between the different types of features and/or objects. In some cases, control strength values may be pixel-wise control strength values.

This may be particularly beneficial in cases where, for example, text has been heavily distorted by effects added to the design by the user. In such a scenario, without the metadata, an automatic process designed to merely identify regions of the screen occupied by the text may fail to appreciate the contours of the text and its significance. In other words, the image-guided content generation modifier is able to leverage the metadata of the different layers to determine which contours are likely significant (i.e., a contour of a text or central object) versus not (i.e., a background image without significant foreground image).

In some cases, the determination may be performed automatically based on the layered structure. In some cases, the determination may be manually selected by a user that informs the image-guided content generation modifier of explicit control strength values for specific objects or masks. In some cases, other types of image processing techniques may be applied to an image in one of the input layers to determine a foreground object that is then associated with an enhanced control strength value. The foreground object may be a visual object that is determined to be positioned in the front or closest part of an image or scene. It is typically the prominent object that stands out against the background, adding depth and perspective to an overall composition.

The computer-generated content may also be associated with a set of output layers. The output layers may be layers that are outputted as part of the computer-generated content and may be provided in a specific manner based on settings indicated by a user. In some cases, how the computer-generated content is split into the set of output layers may be explicitly set by a user. In some cases, one of the generated output layers is a mask layer for one of the input layers. The mask layer may be a special layer used to control the visibility or transparency of specific portions of another layer or layers.

In some cases, the mask layer is generated by using a transparency matte of the input layers. The transparency matte may be a grayscale image that defines the transparency or opacity of individual pixels in an image, such that a foreground object is separated from the background, allowing for compositing or overlaying the object onto a new background. In some cases, the mask layer is generated by an automatic image segmentation technique that involves partitioning an image into multiple segments or regions to identify and delineate objects or regions of interest within the image.

One difficulty in applying the automatic splitting based on input transparency mattes comes when handling cases where the output image contours do not perfectly align with the input matte contours. This could occur when, for example, the control strength has been set to a low value, or when the input contours are particularly complex. As such, in some cases, the mask layer may be generated by inputting the output layers into an image matting model, such as a transformer-based image matting model, that may receive an input of a trimap including three region types including a certain foreground, an unknown one or more regions, and a certain background. Then, using the transparency matte to inform the unknown one or more regions, the transformer-based image matting model may generate the mask layer that more closely aligns the mask layer with the intended foreground.

In some cases, the output layers may further be directly manipulated to further edit the computer-generated content in a non-destructive nature. For example, an output layer may include a foreground object, which may be edited separately from the other layers.

As such, the present technology thus addresses current problems in the art by providing an integrated system that offers users a collaborative and non-destructive way to compositionally control how different features are reflected in an outputted computer-generated content. In this way, the present technology reduces each of the multiple action steps, which requires fewer burdens on both a computing system 1200 (by needing to navigate to and render fewer interfaces) and a user (by reducing the number of steps they need to perform). Furthermore, the present technology also addresses current problems in the art by applying non-destructive editing holistically to an entire workflow of creating and editing content.

FIG. 1 illustrates an example system configured to support non-destructive editing and creation of content based on a layered structure in accordance with some aspects of the present technology. In particular, the example system 100 supports a plurality of user accounts interacting with each other in communities to which they belong.

The system 100 illustrates an example architecture in which users of user accounts interact through an instance of a client application 104 operating on a client device 106. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a collaborative content editing service 102, which provides an infrastructure for supporting the plurality of user accounts to collaboratively create and edit layered content files. The content file may be a self-contained file set created at a collaborative content editing service. The collaborative content editing service 102 may be a distributed service hosted in a cloud computing architecture. The collaborative content editing service 102 may be responsible for hosting various services accessible to the user accounts by the client application 104.

As illustrated in FIG. 1, collaborative content editing service 102 provides a content operations service 114 that propagates state changes based on the edits made to the content files at the client application 104. In some cases, such changes may be propagated to a graphics engine service 120 that applies various features, such as filters and modifiers, to the content files. In some cases, when the content files are shared between two or more user accounts, such changes may be propagated to a collaboration service 116 to propagate such changes to the other instances of client application 104 associated with the user accounts. In some cases, such changes may be propagated to an interface state management service 118 that assists with rendering and managing the different states.

A user account can operate their instance of the client application 104 to create or edit a content file on a canvas interface through the collaborative content editing service 102. In some cases, the client application 104 is a standalone application, a web application, or other type of application. The canvas interface may be a graphical interface on a client device where the user manipulates and edits visual aspects of the content file. In some embodiments, this will be performed by the client application 104 calling an API layer 108 requesting to create or edit the content file. The API layer 108 can then interact with internal services, such as the content operations service 114, the collaboration service 116, and the interface state management service 118, as well as external services to create or edit the content file. When the content file is created, the user account that created the content file may be considered the owner and/or administrator for the content file and may give permission to other user accounts to collaborate on the content file. The content operations service 114 may record the information about the content file using the data service 110 to store information about the content file in the database 112 and/or the cloud services 122.

In some cases, the collaborative content editing service 102 runs at the client device 106 in a thick client architecture. In some cases, in the thick client architecture, a light version of the content operations service 114 may run on the remote server, which may include the collaboration service 116 that populates shadow copies of the content files.

In other cases, the collaborative content editing service 102 runs on a remote server in the cloud services 122 with a thin client architecture, whereby the shadow copies may be populated at the client device 106. In other cases, some modules of the collaborative content editing service 102 may run at the client device 106 while other modules may run on the remote server. It will be appreciated by those of ordinary skill in the art that other system configurations are possible.

As introduced above, the collaborative content editing service 102 provides holistic non-destructive editing throughout an entire workflow. In order to provide such non-destructive editing, layers are leveraged to render a final representation of the content file while keeping all the editing parameters separate and adjustable. The layers may be simply stackable, nestable containers for content added to a canvas interface. Layers may be defined by various metadata, such as an identifier, a parent layer identifier, an order of where the layer appears in the parent's list of children, a user-defined name, and an applied transformation. In some cases, the disclosed parent-child relationship is a sibling relationship, where, for example, an image guided generation layer is a sibling of the other animated layers that are below the image guided generation layer them in the layers interface). The sibling relationships may define how the layers affect one another.

Modifiers may be a variety of non-destructive editing concepts responsible for processing image data and are arranged as pipelines, typically taking the output of a previous modifier in the pipeline as their input, and processing this to derive some output which is then either passed to the next modifier in the pipeline, or rendered to the screen. Modifiers may include filter modifiers that are used for implementing an array of filter types, such as color transformation (e.g., Hue Saturation Lightness (HSL), levels/curves, Black and White (B&W) conversion, shadow/highlight adjustments, color remapping, etc.) and convolution (e.g., blur, sharpen, edge detection, etc.). In some cases, the implementation of the filter modifiers may be a fragment shader.

In addition, modifiers may animate certain features of the content file. In some cases, animation modifiers may be AI-based image-guided content generation modifiers that may modify frames of a video input based on the animated features. Depending on the order of the layers, in some cases, one or more animated features of a content file may be inputs for the AI-based image-guided content generation modifier such that output frames with the animated features are modified based on the AI-based image-guided content generation modifier. In some cases, an image output of an AI-based image-guided content generation modifier may be split into layers and one or more features in the layers may be modified by an animation modifier. Animation modifiers may change color, location, size, movement, or create any other change of selected features.

As introduced above, the interface state management service 118 supports various functions associated with state management and rendering the user interface. In some cases, the interface state management service 118 models the state of a content file that a user is editing in the canvas interface in the form of a content graph. The content graph may be a data structure and model that represents the content and the relationships between the layers of the content file.

In some cases, the interface state management service 118 may further load the bitmap data associated with imported content, which may be stored in the database 112 or the cloud services 122. A basic piece of functionality required by the collaborative content editing service 102 is for the user to be able to import content to use in their project. As such, the interface state management service 118 assists with the import and storage of binary bitmap data.

Furthermore, the interface state management service 118 may interface with the collaboration service 116 to synchronize document states with other users who are editing the same content file. The interface state management service 118 may further interface with the graphics engine service 120 by supplying the content file for rendering. In addition, the interface state management service 118 may capture and handle user input directly. For example, the interface state management service 118 may respond to interactions with a layers panel or a toolbar presented with the canvas interface. However, in cases that require low latency response times (e.g., dragging a layer, or painting in a layer), such input events may be piped directly to the graphics engine service 120 for processing.

As introduced above, the graphics engine service 120 supports various functions associated with rendering graphics content. For example, the graphics engine service 120 may receive the content graph from the interface state management service 118 and may translate the content graph into a processor graph. The processor graph may be an abstract representation of GPU and CPU operations and dataflow required to render the content file. In some cases, the graphics engine service 120 evaluates the processor graph in order to visualize the content file at the canvas interface. Furthermore, as introduced above, the graphics engine service 120, being a part of the collaborative content editing service 102, may run at the client device 106. In other cases, the graphics engine service 120 and the collaborative content editing service 102 may run at the remote server and a shadow copy may be rendered at the client device 106.

Collaborative content editing service 102 also provides the collaboration service 116 that may interface with a multi-user state management library. In some cases, the collaboration service 116 interfaces with the interface state management service 118 to synchronize the content file to other users using the multi-user state management library.

In some embodiments, the collaborative content editing service 102 is configured such that the majority of communications between the collaborative content editing service 102 and the client application 104 pass through the API layer 108. The client application 104 can request responses from various services provided by the collaborative content editing service 102 from the API layer 108. Additionally, services within the collaborative content editing service 102 can communicate with each other by sending messages through the API layer 108. In some cases, the API layer 108 includes a WebSocket server that is used as a hub for client applications 104 to share information about states and changes to the states of the content file. Furthermore, the API layer 108 may assist with managing collaborative sessions by supporting extensions to allow the collaborative content editing service 102 to hook into the editing process for the purpose of storage, metrics, logging, and managing synchronization.

Although the collaborative content editing service 102 is described with respect to a particular system architecture and communication flow, it will be appreciated by those of ordinary skill in the art that other system configurations are possible.

Figure 2:
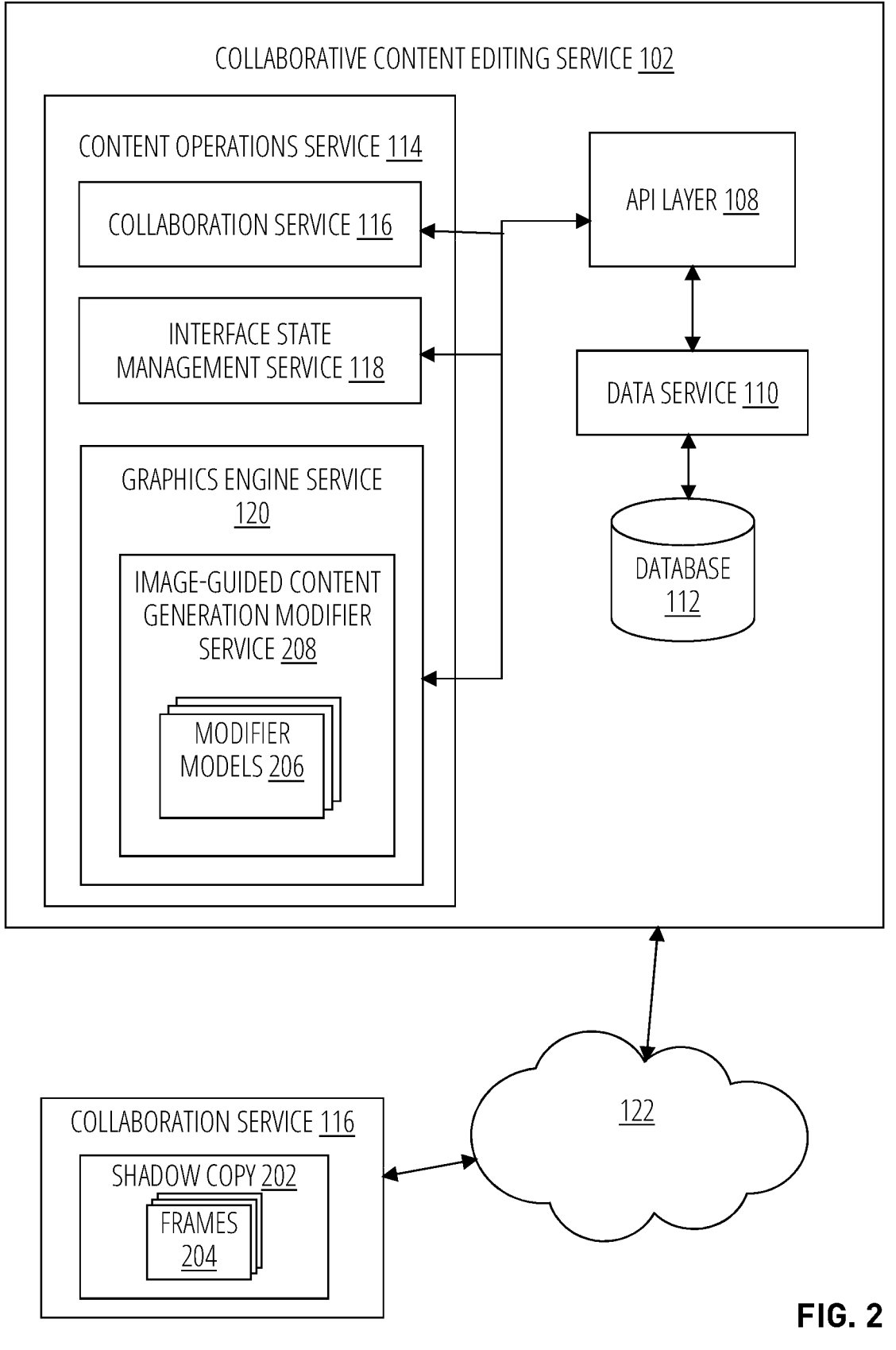
FIG. 2 illustrates an example collaborative content editing service configured to support user accounts in creating and managing collaborative animated content files in accordance with some aspects of the present technology.

FIG. 2 illustrates an example collaborative content editing service configured to support user accounts in creating and managing collaborative animated content files in accordance with some aspects of the present technology.

As introduced above, the collaborative content editing service 102 may run at the client device 106 in a thick client architecture. FIG. 2 shows an example architecture with a focus of the collaborative content editing service 102 running at the client device 106 and a light version of content operations service 114 (not shown) running at the remote server. The light version of the content operations service 114 may include a collaboration service 116 that is shown and may generate the shadow copies 202 of the content files.

In some cases, the content files may be animated files and/or include animated features. As such, to generate the animated features, a plurality of animation frames may be generated. The plurality of animation frames may be generated for display, and in some cases, the animation frames may complete a loop of a couple of seconds that may be displayed in a continuous loop in a preview interface. In some cases, the looping animation frames may be displayed in a preview interface, and changes made at a canvas interface may be displayed in real-time, or near real-time, alongside the canvas interface in the preview interface.

In some cases, the animated content file may include one or more layers with animated features that are configured to be inputs to an image-guided content generation modifier layer, such that each frame of the one or more layers with animated features may be required to be modified by the image-guided content generation modifier. As such, to generate the animated features, a plurality of frames 204 may be generated and an image-guided content generation modifier service 208 of the collaborative content editing service 102 may modify the frames 204.

For example, if a child layer includes a text element that is set for animation, if a parent layer to the child layer includes the image-guided content generation modifier, each frame associated with the child layer may be required to be modified by the image-guided content generation modifier to generate an cohesive animation wherein the frames appear to be modified in the same manner.

In some cases, modifying each frame, frame by frame, as they are displayed in an animation, may result in some latency issues. Therefore, in some cases, especially when there is a collaboration service 116 that already manages and updates a shadow copy 202 based on received updates, it may be beneficial to retrieve such frames from the shadow copy 202 rather than from the client device 106. Furthermore, such frames 204 may be modified simultaneously in parallel-running modifier models 206 that may be supported or controlled by the image-guided content generation modifier service 208.

Although the collaborative content editing service 102 is described with respect to a particular system architecture and communication flow, it will be appreciated by those of ordinary skill in the art that other system configurations are possible. For example, the image-guided content generation modifier service 208 may be a separate service from the graphics engine service 120.

FIG. 3 illustrates an example method for animation generation based on a layered image structure and use of a shadow copy with an image-guided content generation modifier in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes storing one or more layers in memory, wherein the one or more layers are stored in relation to a content file at step 302. According to some examples, the data service 110 or the collaborative content editing service 102 may store the one or more layers in the memory. In some cases, the one or more layers are stored in relation to a content file. The stored one or more layers refer to stackable, nestable containers for content added to a canvas interface. Layers may be defined by various metadata, such as an identifier, a parent layer identifier, an order of where the layer appears in the parent's list of children, a user-defined name, and an applied transformation. In some cases, the one or more layers may include all the layers of the content file. In other cases, the one or more layers may include a selected few of the layers of the content file.

According to some examples, the method includes receiving, from a client application of the collaborative content editing service, animation metadata pertaining to an animating element in a first layer of the one or more stored layers of the content file at step 304. According to some examples, the API layer 108 or the collaborative content editing service 102 may receive animation metadata. In some cases, the animation metadata describes how the animating element is animated. Furthermore, in some cases, the first layer is a child layer of a second layer, and the second layer includes an image-guided content generation modifier.

According to some examples, the method includes applying the animation metadata to a shadow copy of the content file at step 306. According to some examples, the collaboration service 116 or the collaborative content editing service 102 may apply the animation metadata to the shadow copy. The shadow copy may be stored with the collaboration service for real-time state synchronization. The shadow copy may be updated based on metadata associated with changes made to a client copy of the content file stored at the client device. As such, there is no need to upload the entire content file in order to generate animation frames.

According to some examples, the method includes generating two or more animation frames of the content file based on the animation metadata at step 308. According to some examples, the collaboration service 116 or the collaborative content editing service 102 may generate the two or more animation frames. In some cases, the two or more animation frames are generated from the shadow copy with the applied animation metadata. For example, if an animated feature of the content file is that there are changing colors to a particular region of the content file, the two or more animated frames would include the various permutations of the changes in color to result in an animation that displays the changing colors. In addition to changing in color or texture, movement of various features may be considered animation as well.

In some cases, the generation of at least some of the two or more animation frames includes encoding animation data in pixels of the at least some of the two or more animation frames. In some cases, the animation data includes optical flow vectors generated based on the animation metadata. In some cases, the two or more animation frames are at intermittent intervals and separated by interposed animation frames. In some cases, the generation of at least some of the two or more animation frames further includes sending the encoded animation data to the client application that uses the encoded animation data to create temporary interposed animation frames interposed between the modified animation frames for display in the animation while modified interposed animation frames are being generated.

For example, an animation includes 100 frames and the two or more animation frames are at intermittent intervals of 10 frames, such that the two or more frames include frames 1, 11, 21, etc. In some cases, in generating the two or more frames, not only are the features of the frames being generated but also encoded animation data of the pixels that teaches how features are moved through the frames. The animation data encoded into the two or more animation frames may be sent to the client application such that similar pixels in the respective modified animation frames may be interpolated to generate the temporary interposed animation frames.

As an example, if in frame 1 there is text on a left side, then in frame 11 the text has moved to the right, then in frame 21, the text has moved up, these movements may be encoded in the animation data. The encoded animation data may then be used to interpolate temporary frames that interpose the modified animated frames. The interpolated temporary frames would be generated by moving the pixels of the modified animated frames in accordance with the encoded animation data. So, to continue the example, the modified animated frames may be in the style of photorealism and the moving text may be modified accordingly in the modified animated frames. The temporary frames may then be interpolated between the two modified animated frames such that the photorealism text moves according to the encoded animation data. The generated temporary frames may not need to be high-resolution but are mostly to give the user a sense of what the animation looks like while the interposed animation frames are being modified by the image-guided content generation modifier service 208 at the collaborative content editing service 102.

According to some examples, the method includes applying the image-guided content generation modifier to the two or more animation frames in parallel to generate modified animation frames at step 310. According to some examples, the image-guided content generation modifier service 208 or the collaborative content editing service 102 may apply the image-guided content generation modifier. Applying the image-guided content generation modifier in parallel may be provided by parallel-running modifier models 206 that modify two or more animation frames simultaneously. In some cases, the image-guided content generation modifier is an artificial intelligence (AI) image-guided content generation modifier that leverages a neural network structure to control one or more diffusion models. The neural network structure may be guided by metadata of the one or more layers. For example, if the metadata of the one or more layers indicates the distinction between a background and a foreground object, they may be treated differently.

In some cases, the metadata of the one or more layers guides the image-guided content generation modifier to boost a control strength, such as of one or more contours contiguous, with a respective transparent background of the two or more animation frames. For contour-based guidance for image generation in existing technology, the limitation stems from having a control strength value that serves as a strength of the guidance, based on a single floating-point value that is applied uniformly across the entire surface of the image. The drawback to this approach is that different areas of a user's design are likely to vary in terms of their significance or the extent to which the precision of their contours matter in the final generated image. For example, for areas where the user has added typography to their design, it is likely to be very important that the generated image pays close attention to the contours of the typography in order for the text to be legible. Conversely, for other areas of the image, the user may want to provide more low-fidelity/gestural guidance in terms of the layout or 'feel' they want to achieve in that area. As such, such a user may be looking for some freedom for how certain contours of certain objects are taken into consideration in creating the computer-generated content.

In the present technology, because of its layered structure, the image-guided content generation modifier receives metadata that reveals different features for the different objects of an image. For example, the layered structure allows for the creation of separate layers for text objects, brush strokes, images, transparent background images, etc. As such, because of the additional metadata, a control strength values for different features and/or objects may be tailored based on the metadata that distinguishes between the different types of features and/or objects. In some cases, control strength values may be pixel-wise control strength values.

This may be particularly beneficial in cases where, for example, text has been heavily distorted by effects added to the design by the user. In such a scenario, without the metadata, an automatic process designed to merely identify regions of the screen occupied by the text may fail to appreciate the contours of the text and its significance. In other words, the image-guided content generation modifier is able to leverage the metadata of the different layers to determine which contours are likely significant (i.e., a contour of a text or central object) versus not (i.e., a background image without significant foreground image).

In some cases, the determination may be performed automatically based on the layered structure. In some cases, the determination may be manually selected by a user that informs the image-guided content generation modifier of explicit control strength values for specific objects. In some cases, other types of image processing techniques may be applied to an image in one of the input layers to determine a foreground object that is then associated with an enhanced control strength value. The foreground object may be a visual object that is determined to be positioned in the front or closest part of an image or scene. It is typically the prominent object that stands out against the background, adding depth and perspective to an overall composition.

According to some examples, the method includes sending the modified animation frames to be displayed in a preview interface displayed alongside a canvas interface of the client application that contains the animating element at step 312. In some cases, the modified animation frames are presented as an animation. As such, the animation is generated based on guidance from the metadata of the one or more layers including the animation metadata. According to some examples, the API layer 108 or the collaborative content editing service 102 may send the modified animation frames. In some cases, the modified animation frames are displayed as a continuous loop through the modified animation frames over a period of time.

Furthermore, the modified animation frames may include a set of output layers corresponding to the one or more layers. In some cases, there may be a user indication of an explicit layer split for the set of output layers. For example, the user may indicate that the layered structure of the input layers be presented in the set of output layers. The input layers may include a foreground object and a background and the set of output layers may be instructed to retain that structure. The user may also request to change the layered structure to include more or less than the original layered structure.

FIG. 4 illustrates an example method for animation generation based on a layered image structure and use of temporary interposed animation frames in accordance with some aspects of the present technology. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving, from a client application of a collaborative content editing service, animation metadata pertaining to an animating element in a first layer of one or more stored layers of a content file at step 402. According to some examples, the API layer 108 or the collaborative content editing service 102 may receive animation metadata. In some cases, the animation metadata describes how the animating element is animated. Furthermore, in some cases, the first layer is a child layer of a second layer, and the second layer includes an image-guided content generation modifier.

According to some examples, the method includes generating two or more animation frames of the content file based on the animation metadata at step 404. According to some examples, the collaboration service 116 or the collaborative content editing service 102 may generate the two or more animation frames. In some cases, the two or more animation frames are at intermittent intervals and separated by interposed animation frames.

According to some examples, the method includes sending the modified animation frames to be displayed in a preview interface displayed alongside a canvas interface of the client application that contains the animating element, wherein the modified animation frames are presented as an animation, wherein the two or more animation frames are at intermittent intervals and separated by interposed animation frames at step 406. According to some examples, the API layer 108 or the collaborative content editing service 102 may send the modified animation frames.

According to some examples, the method includes modifying the interposed animation frames by applying the image-guided content generation modifier to the respective interposed animation frames in parallel while the modified animation frames are displayed at the client application at step 408. According to some examples, the graphics engine service 120 or the collaborative content editing service 102 may modify the interposed animation frames.

According to some examples, the method includes after the modified interposed animation frames are generated, sending the modified interposed animation frames to replace temporary interposed animation frames interposed between the modified animation frames to display an updated animation at the client application at step 410. According to some examples, the API layer 108 or the collaborative content editing service 102 may send the modified interposed animation frames.

In some cases, the method includes using the animation metadata or the two or more animation frames to generate optical flow vectors, and using the optical flow vectors to generate the temporary interposed animation frames. In some cases, the method includes, determining, based on the optical flow vectors, one or more regions in the two or more animation frames that do not have animation. In some cases, the method includes sending instructions to hold the regions in memory of a first modified animation frame throughout the animation. By holding the regions in memory, parts of the animation that were not intended to be moving based on the two or more animation frames may remain still during the animation. Because each frame is slightly different, the image-guided content generation modifier may modify each frame slightly differently such that the regions with no movement may be modified differently. The image-guided content generation modifier is image-guided so any change to the entirety of the frame may change areas of different frames that look the same.

In some cases, the method includes generating a masked region of the respective animation frames that excludes the one or more regions. In some cases, the applying of the image-guided content generation modifier is to the masked region of the respective animation frames. Therefore, only the region that is masked receives a treatment by the image-guided content generation modifier. In some cases, the masked region is generated by using at least one of a transparency matte of the respective animation frames or an automatic image segmentation technique of the respective animation frames to automatically generate the masked region.

In some cases, the method further includes receiving a text prompt or contextual data to further guide the image-guided content generation modifier in generating the modified animation frames. In some cases, the contextual data includes optical flow vector data that provides context to movement of one or more features of the two or more animation frames. For example, contextual data may indicate the speed at which movement of a feature such that motion blur may be applied. As another example, the text prompt may indicate the object that is animating is flashing various colors at a speed faster than the frame rate of the two or more animation frames. Therefore, if the two or more frames are at every 10th frame while the flashing is occurring at every 5th frame, the temporary interposed animation frames would not change in color. However, with a text prompt that indicates that the object is flashing between red and green, the temporary interposed animation frames may be generated accordingly.

Figure 5:
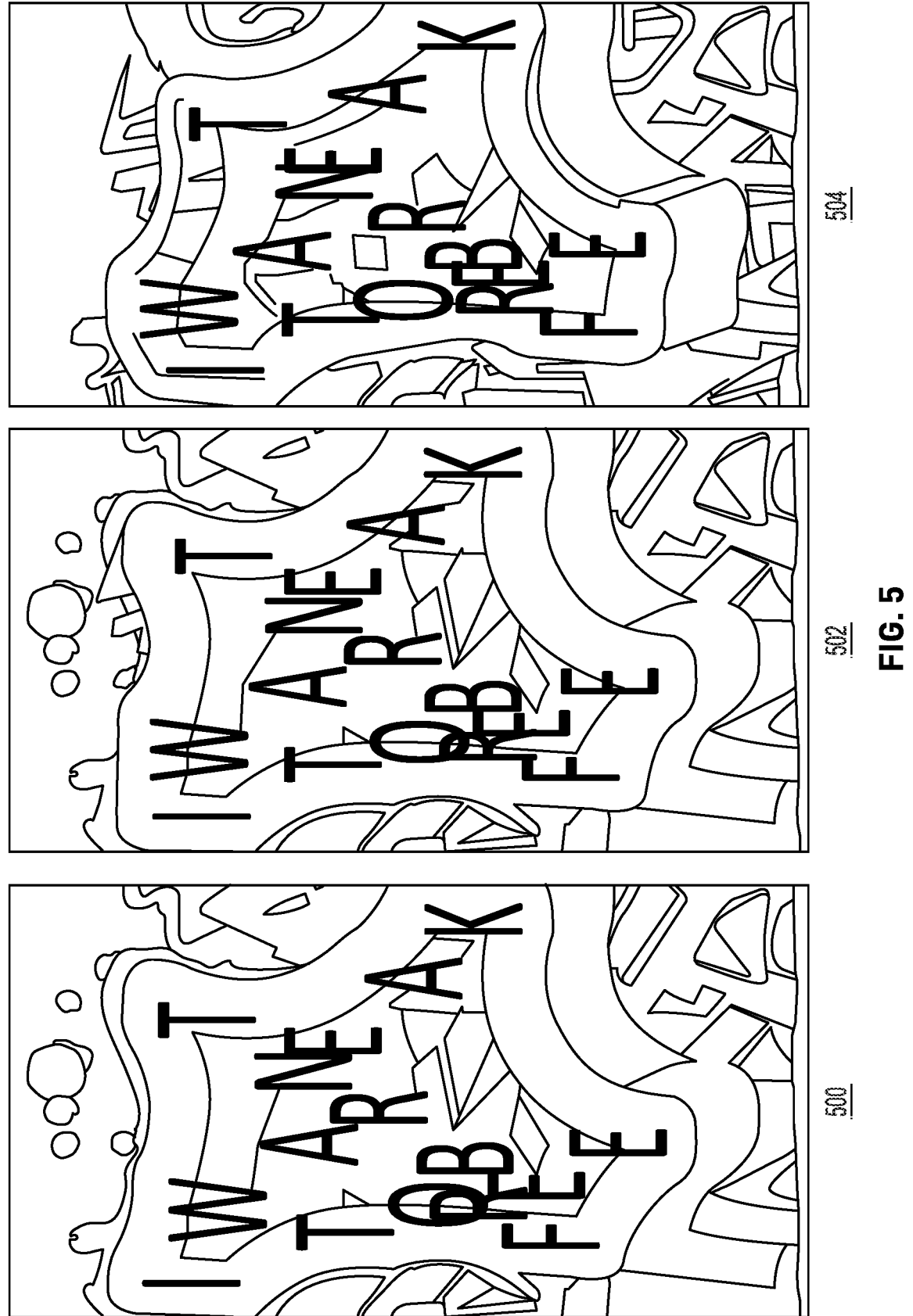
FIG. 5 illustrates three example animation frames in accordance with some aspects of the present technology.

FIG. 5 illustrates three example animation frames that correspond to the three example modified animation frames in accordance with some aspects of the present technology.

More specifically, a first animation frame 500, a second animation frame 502, and a third animation frame 504 are illustrated in FIG. 5. The first animation frame 500 may be frame 1, the second animation frame 502 may be frame 6, and the third animation frame 504 may be frame 11. In this example, the first animation frame 500 and the third animation frame 504 may be included in the two or more animation frames that are at intermittent intervals and separated by interposed animation frames, frames 2-10. Therefore, the first animation frame 500 and the third animation frame 504 may be generated using a shadow copy at the collaborative content editing services 102. Once generated, they may be sent to the image-guided content generation modifier service 208 to generate modified animated frames, shown in FIG. 6. While the modified animated frames are being generated at the collaborative content editing service 102, at the client application, temporary interposed animation frames may be generated based on the encoded animation data.

Figure 6:
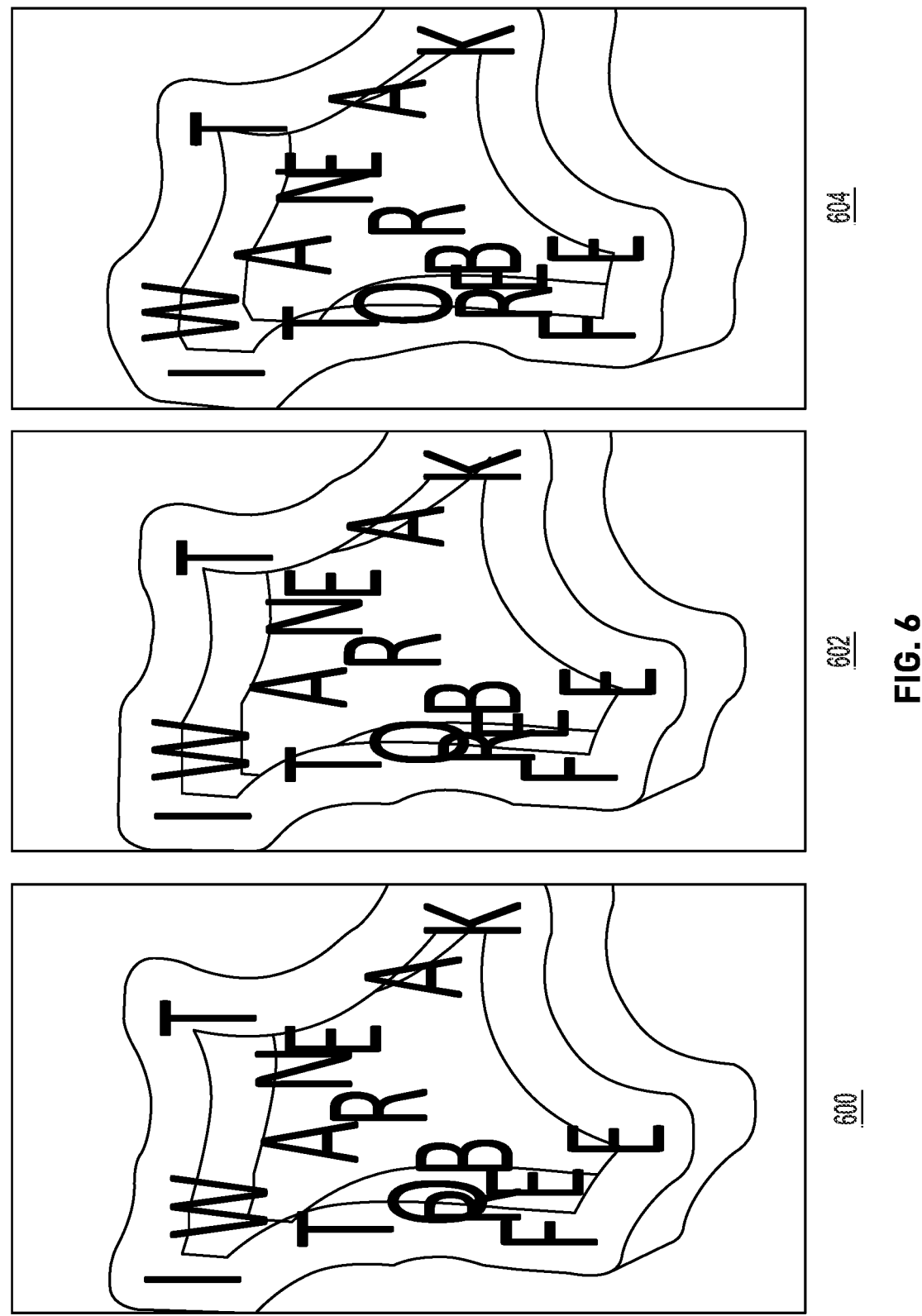
FIG. 6 illustrates three example modified animation frames that correspond to the three example animation frames that would be presented in a preview interface in accordance with some aspects of the present technology.

FIG. 6 illustrates three example modified animation frames that would be presented in a preview interface in accordance with some aspects of the present technology.

More specifically, a first modified animation frame 600, a second modified animation frame 602, and a third modified animation frame 604 are illustrated in FIG. 6. The first modified animation frame 600 may be frame 1, the second modified animation frame 602 may be frame 6, and the third modified animation frame 604 may be frame 11. Therefore, while the second modified animation frame 602 is being generated, the encoded animation data of the changes between the first animation frame 500 through the third animation frame 504, is used to change or move pixels between the first modified animation frame 600 and the third modified animation frame 604. The temporary interposed animation frames may be lower resolution than the modified animation frames, such as second modified animation frame 602. The temporary interposed animation frames are produced before modified interposed animation frames are generated and serve as a preview.

As shown in the modified animation frames in FIG. 6, the typography spells out "I WANT TO BREAK FREE" with the letters moving. The first "E" at the bottom is seen to move upward, the "O" and the "R" in FREE are conjoined in first modified animation frame 600 and more separated in third modified animation frame 604. The temporary interposed animation frames may be generated based on the encoded animation data, which may provide insight into the animation changes that need to occur to change from first modified animation frame 600 to third modified animation frame 604. Some details may be missing and ultimately the interposed animation frames, including the second modified animation frame 602, may be more high-resolution. However, the temporary interposed animation frames only need to provide a general feel of the animation for the user while the modified interposed animation frames are being generated. In some cases, the interposed animation frames may or may not be temporary. In some cases, it is unlikely that all frames will be diffused and the temporary interposed frames will help create a smooth transition between modified frames.

FIGS. 7-11 illustrate example graphical user interfaces with various ornamental features. Ornamental designs of a display system showing a field of view of a visual display and/or at least a portion of a display showing each of the graphical user interfaces formed by each of the various features alone or in combination with one or more other features, as well as ornamental designs formed by an entirety or portions of the graphical user interfaces, are contemplated.

For example, it is contemplated that a design may include an ornamental feature of a layer interface on a left side of a graphical user interface (GUI) in combination with a canvas interface and preview interface in the center of the GUI as well as a player interface at the bottom of the GUI.

Figure 7:
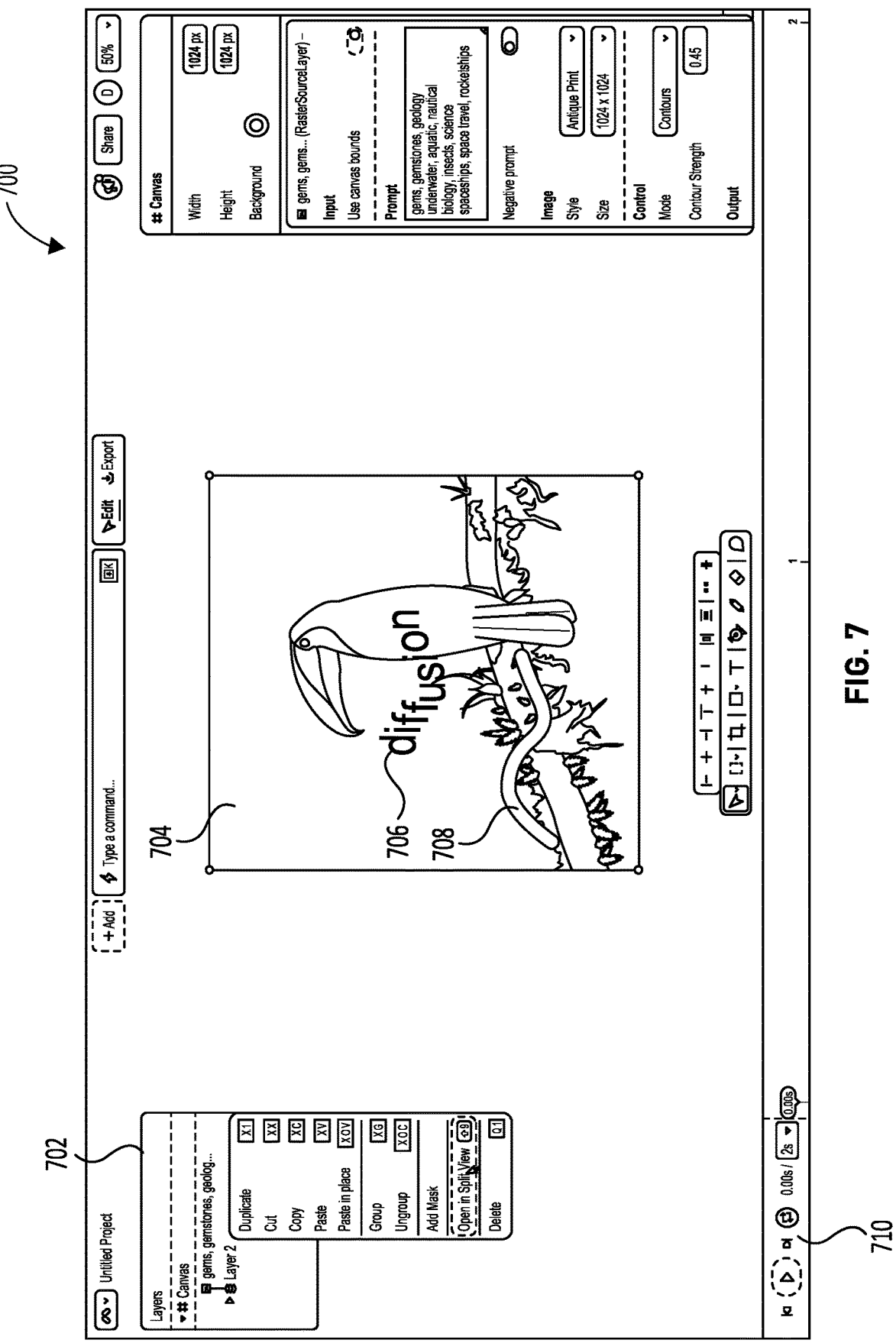
FIG. 7 illustrates an example graphical user interface depicting an image with an animation text in a canvas interface in accordance with some aspects of the present technology.

FIG. 7 illustrates an example graphical user interface depicting an image with an animation text in a canvas interface in accordance with some aspects of the present technology.

The example graphical user interface 700 includes a canvas interface 704. The canvas interface 704 may be provided by a client application 104 at a client device 106 and interfaces with a collaborative content editing service 102. The canvas interface 704 may be a graphical interface on a client device where the user manipulates and edits visual aspects of the content file.

The example graphical user interface 700 includes a layers interface 702. The layers interface 702 may be an interface that displays the various layers of a content file in an order of a top layer at the top and a bottom layer at the bottom. Each layer in the layers interface 702 may be associated with an object displayed in the canvas interface 704 unless they are explicitly hidden by a user or directly covered by an object in one of the layers above it As such, the layer at the top of the layers interface 702 is also the layer at the top of the canvas interface 704. For example, as shown in FIG. 7, an animating text object 706 and a line object 708 may be foreground object in the canvas interface 704 and therefore on a top layer compared to the image of the bird in the background (see layers interface 702 in FIG. 8).

In addition, there may be a player interface 710 that allows a user to manage the playback of the animation.

Figure 8:
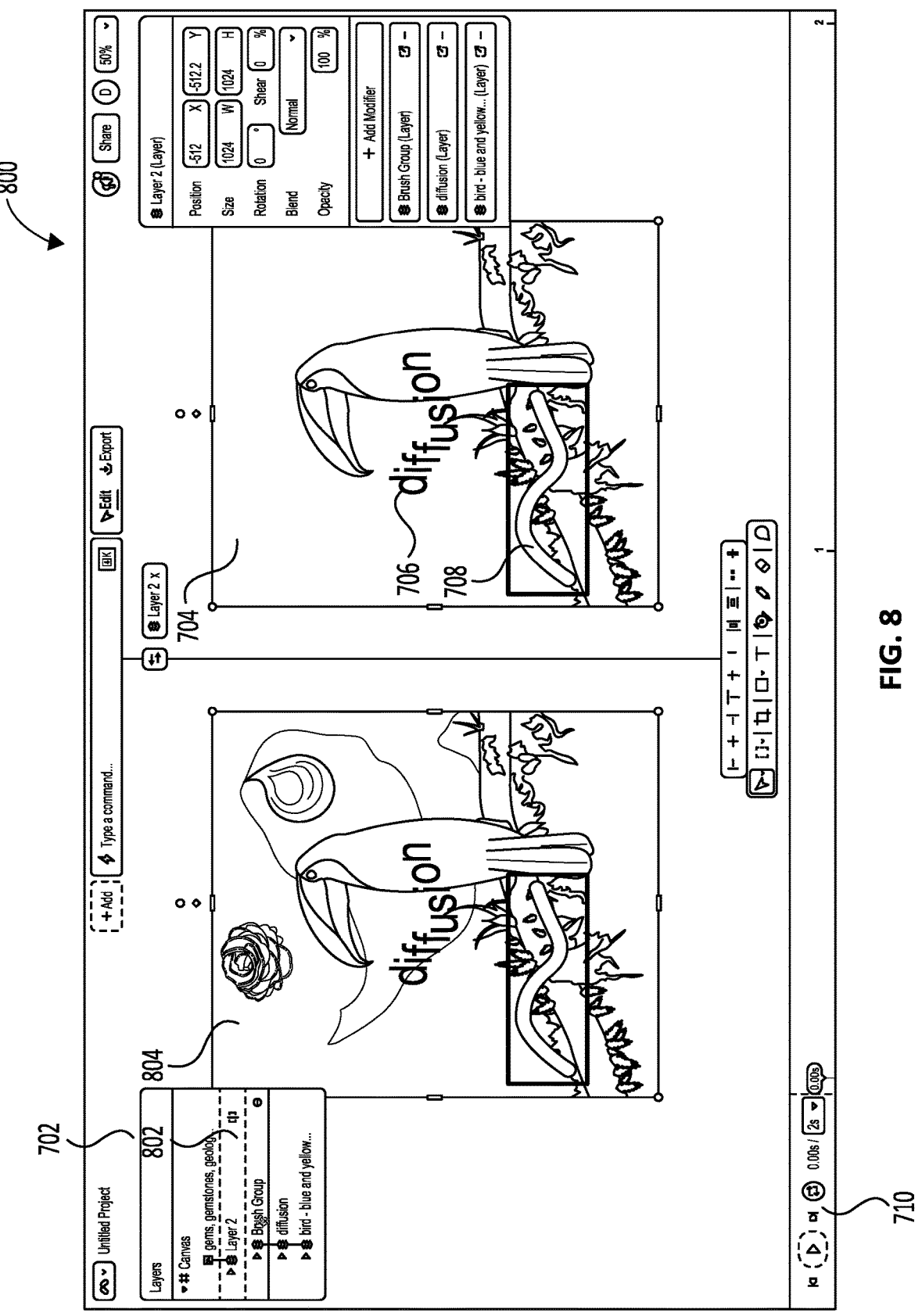
FIG. 8 illustrates an example graphical user interface depicting an image with an animation text in a canvas interface and a preview interface of a playback of the features of the canvas interface in accordance with some aspects of the present technology.

FIG. 8 illustrates an example graphical user interface depicting an image with an animation text in a canvas interface and a preview interface of a playback of the features of the canvas interface in accordance with some aspects of the present technology.

The example graphical user interface 800 includes a set of layers grouped together into a group of layers 802 that is selected. A preview interface 804 may display the playback of the features of the canvas interface 704. In some cases, the modified animation frames may be displayed as a continuous loop through the modified animation frames over a period of time in the preview interface 804. As shown in the layers interface 702, the image-guided content generation modifier that is further modified by keywords including "gems, gemstones, geology, etc" is applied to a child group of layers 802 that includes a "brush group" that refers to the line object 708, "diffusion" that refers to the animating text object 706, and "bird-blue and yellow" that refers to the background image. In other words, the objects and features presented in the canvas interface 704 are inputs through the modifiers such as the image-guided content generation modifier in the layers. As such, the preview interface 804 displays an output with modified features and objects.

In a panel of generation options, which may appear in the right-side panel, there may be a prompt input field for providing text prompts that would guide an image-guided content generation modifier to add specific objects, themes, or styles (or exclude specific objects, themes, or styles). In FIG. 8, the prompt may have included "gems, gemstones, geology, etc".

The panel of generation options may also include control strength controls that provide a more granular control of control strength values and color strength value. The control strength value may be a parameter or metric that determines the influence or strength of control applied to a contour-based guidance of the image-guided content generation modifier. The color strength value may be a parameter or metric that determines the influence or strength of control applied to a color input by the image-guided content generation modifier.

The panel of generation options may also include a prompt guidance strength that refers to a parameter or metric that determines the influence or strength of control applied to the prompt by the image-guided content generation modifier. The panel of generation options may also include a steps control that controls a number of steps that is used for generating the computer-generated content. The more steps that are used, typically, the clearer and more refined the computer-generated content is. The panel of generation options may also include a seed control that controls which seed is used for generating the computer-generated content.

In some cases, the method includes using a user-selected seed or a random seed as a starting point for generating the computer-generated content. For example, the user-selected seed or the random seed may include a series of numbers that indicates a distinctive style. When the same series of numbers is used, the same distinctive style is outputted to help with creating consistent styles when desired.

Then, the image-guided content generation modifier may be applied to the group of layers 802 to generate a preview of one frame of the animation or the animation may start playing automatically. In some cases, playback is controlled by the player interface 710.

Figure 9:
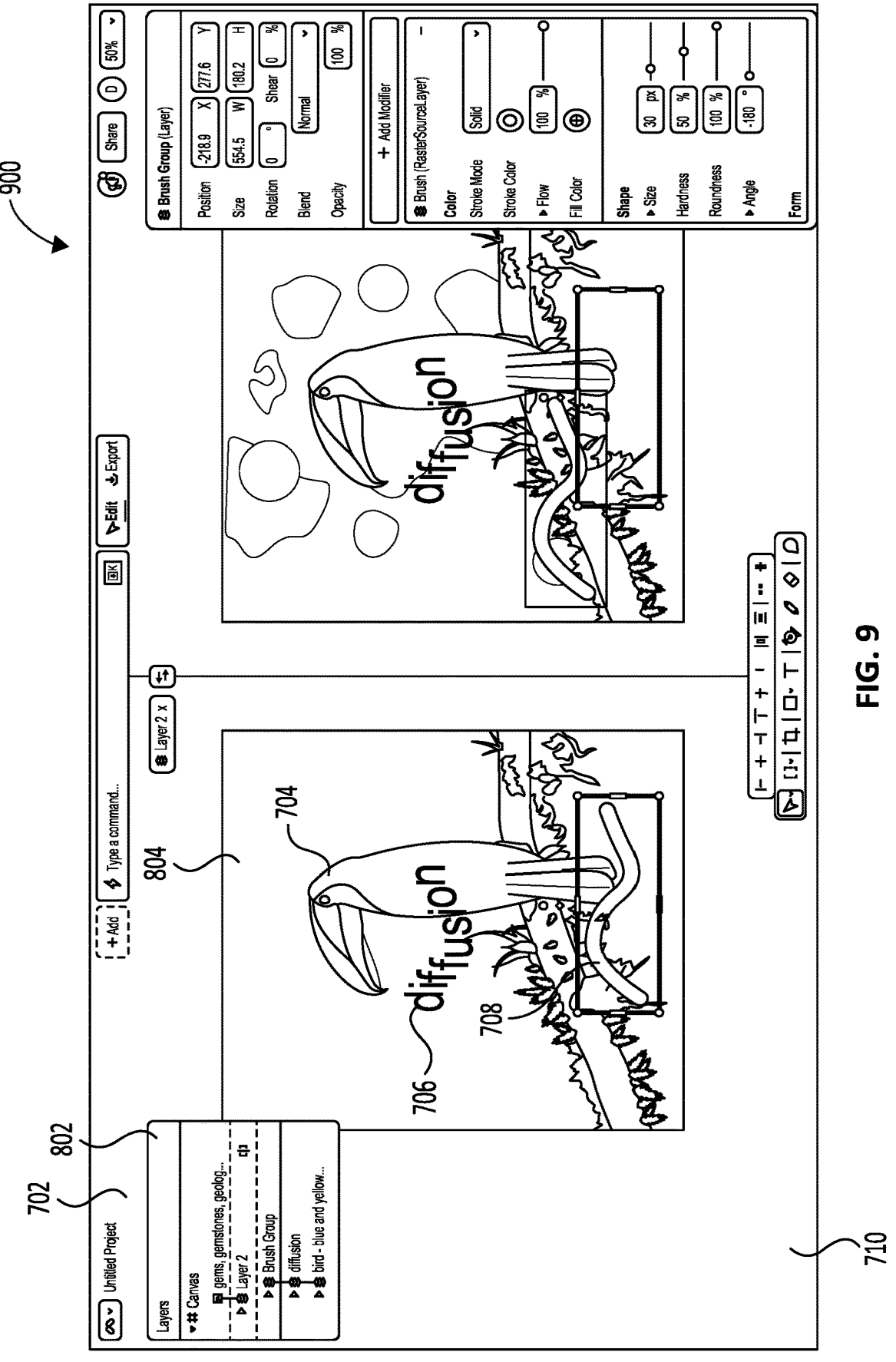
FIG. 9 illustrates an example graphical user interface depicting an image with an animation text in a canvas interface and a preview interface of a playback of the features of the canvas interface in accordance with some aspects of the present technology.

FIG. 9 illustrates an example graphical user interface depicting an image with an animation text in a canvas interface and a preview interface of a playback of the features of the canvas interface in accordance with some aspects of the present technology.

In example graphical user interface 900, the line object 708 may have been moved. In the preview interface 804, an updated modified animation frame that includes the moved line object 708 may not have been generated yet, given a slight latency because of the image-guided content generation modifier. In some cases, the move may be highlighted in the preview interface 804 while the updated modified animation frame is being generated to provide some indication of the change in the preview interface 804.

In addition, the canvas interface 704 and the preview interface 804 may swap positions based on a user's preference. In FIG. 9, the canvas interface 704 and the preview interface 804 have swapped positions compared to FIG. 8.

Figure 10:
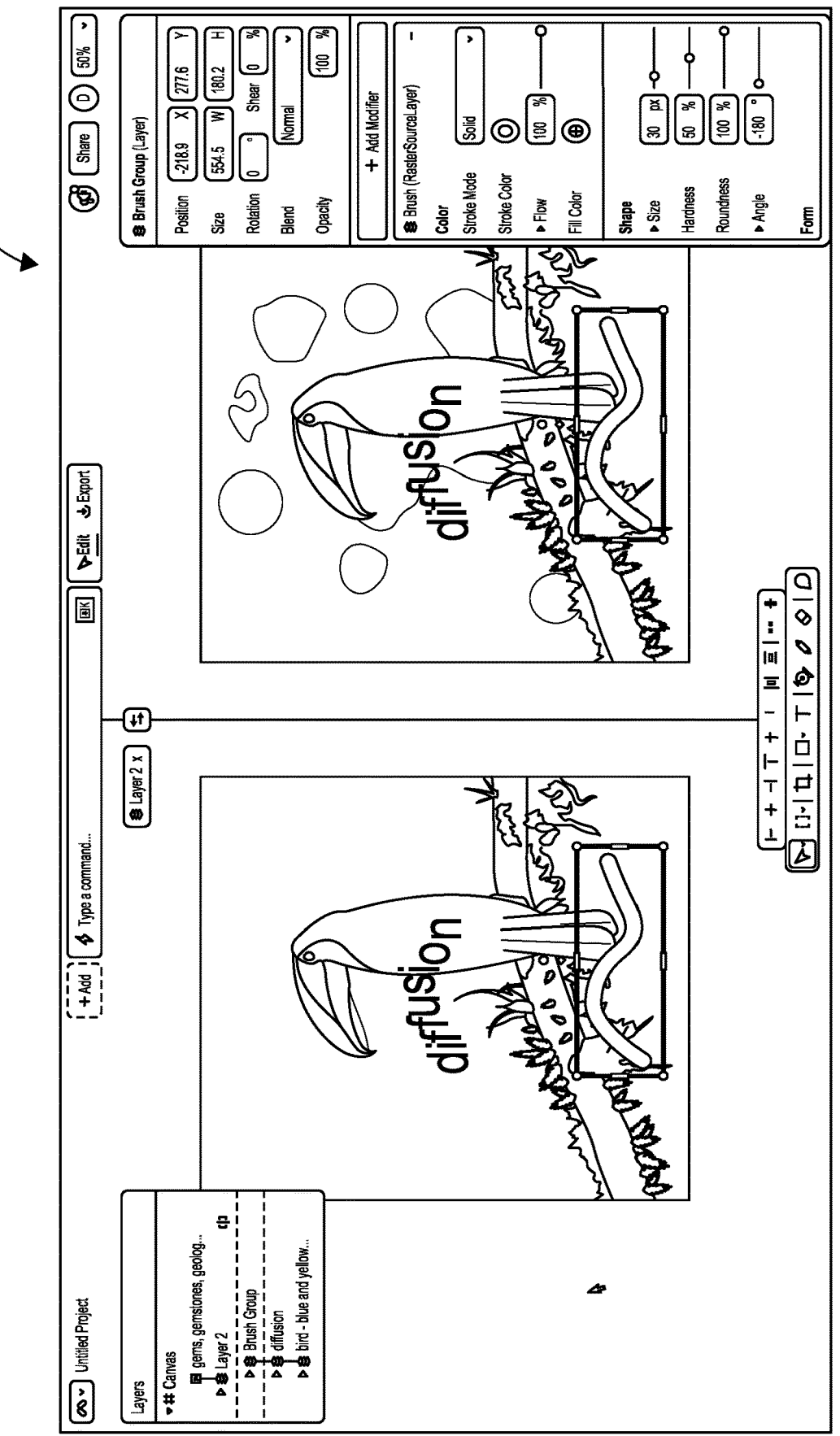
FIG. 10 illustrates an example graphical user interface depicting an image with an animation text in a canvas interface and a preview interface of a playback of the features of the canvas interface in accordance with some aspects of the present technology.

FIG. 10 illustrates an example graphical user interface depicting an image with an animation text in a canvas interface and a preview interface of a playback of the features of the canvas interface in accordance with some aspects of the present technology.

In example graphical user interface 1000, the preview interface 804 displays the updated modified animation frame that includes the moved line object 708. Because of the nature of the image-guided content generation modifier, the color and texture of the line object 708 may change based on the movement.

Figure 11:
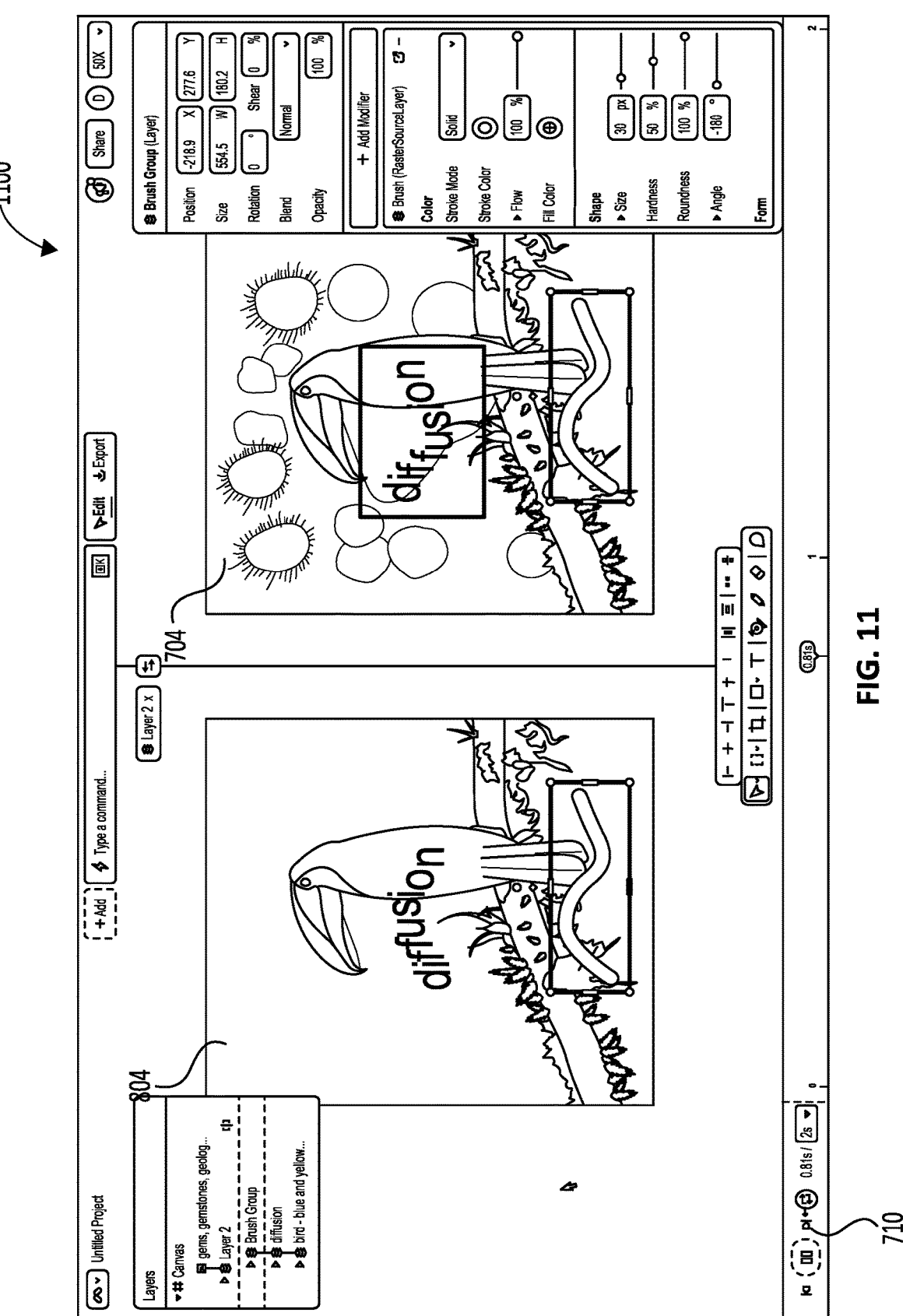
FIG. 11 illustrates an example graphical user interface depicting an image with an animation text in a canvas interface and a preview interface of a playback of the features of the canvas interface in accordance with some aspects of the present technology.

FIG. 11 illustrates an example graphical user interface depicting an image with an animation text in a canvas interface and a preview interface of a playback of the features of the canvas interface in accordance with some aspects of the present technology.

In example graphical user interface 1100, the player interface 710 may have received an indication to play the animation. In some cases, the animation plays automatically. As shown in the preview interface 804, in some cases, there may be a lag or delay between what is presented at the canvas interface 704 and what is presented at the preview interface 804. In some cases, the lag or delay may be fixed by displaying the temporary interposed animation frames (not shown in FIG. 11).

As shown in FIG. 11, the modified animation frame that is shown has a different background image than the one shown in FIG. 10, due to the nature of the image-guided content generation modifier. As such, in some cases, based on the optical flow vectors, one or more regions in the animation frames may show that there is no movement in the area surrounding the bird. In some cases, a masked region of the respective animation frames that excludes the one or more regions may be generated wherein application of the image-guided content generation modifier is to the masked region of the respective animation frames. In some cases, instructions to hold the regions in memory of a first modified animation frame throughout the animation may be sent. Although not shown in FIG. 11, in some cases, the user may have the ability to modify the animation such that the regions that are not moving in canvas interface 704 are also not changing in the preview interface 804.

Figure 12:
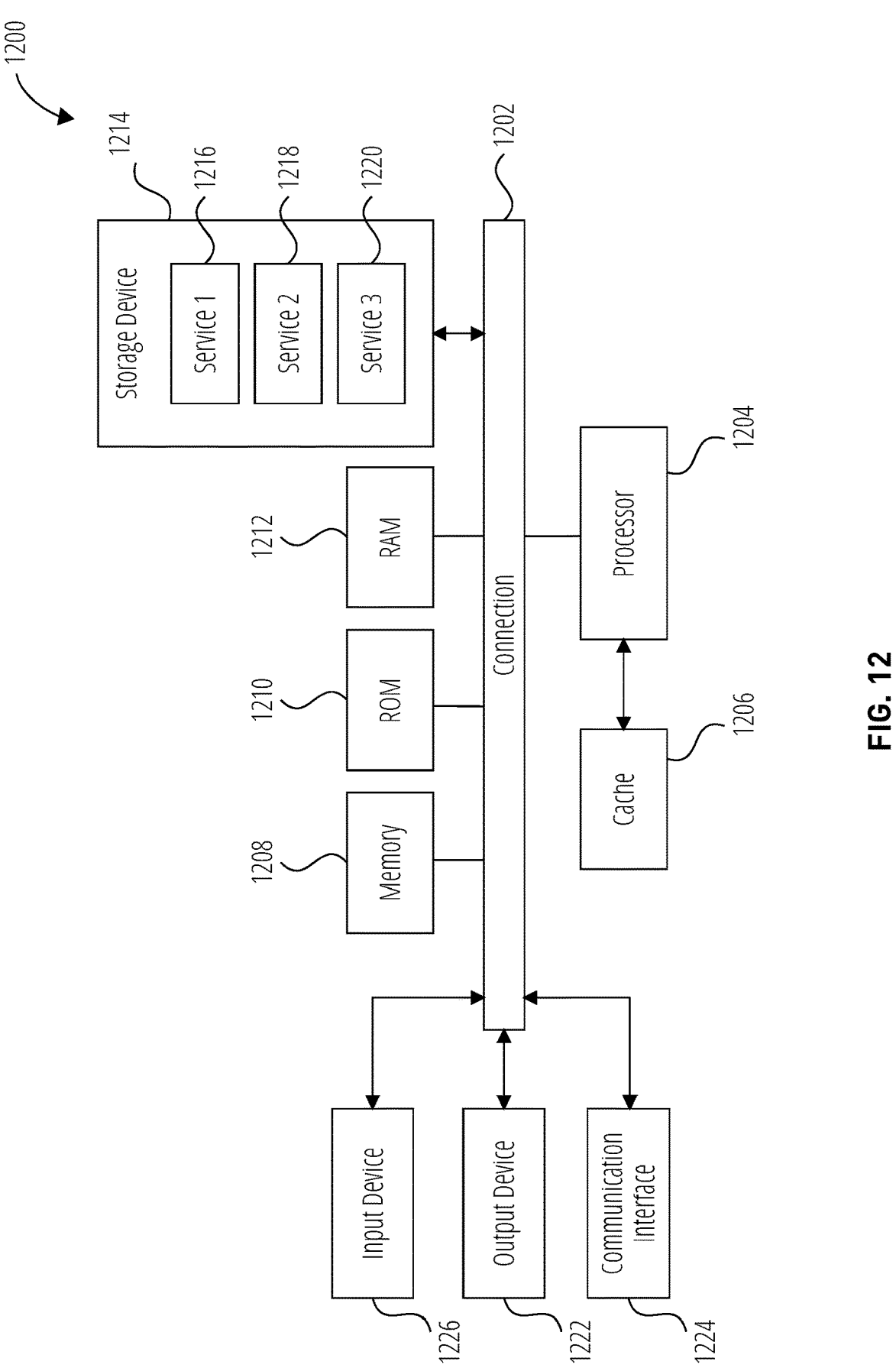
FIG. 12 illustrates an example computer system in accordance with some aspects of the present technology.

FIG. 12 shows an example of computing system 1200, which can be for example any computing device making up collaborative content editing service 102 or client devices 106, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) processor 1204 and connection 1202 that couples various system components including system memory 1108, such as read-only memory (ROM) 1210 and random access memory (RAM) 1212 to processor 1204. Computing system 1200 can include a cache of high-speed memory 1208 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs, VRAMs, etc, read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the hardware components, such as processor 1204, connection 1202, output device 1222, etc., to carry out the function.

Figure 13:
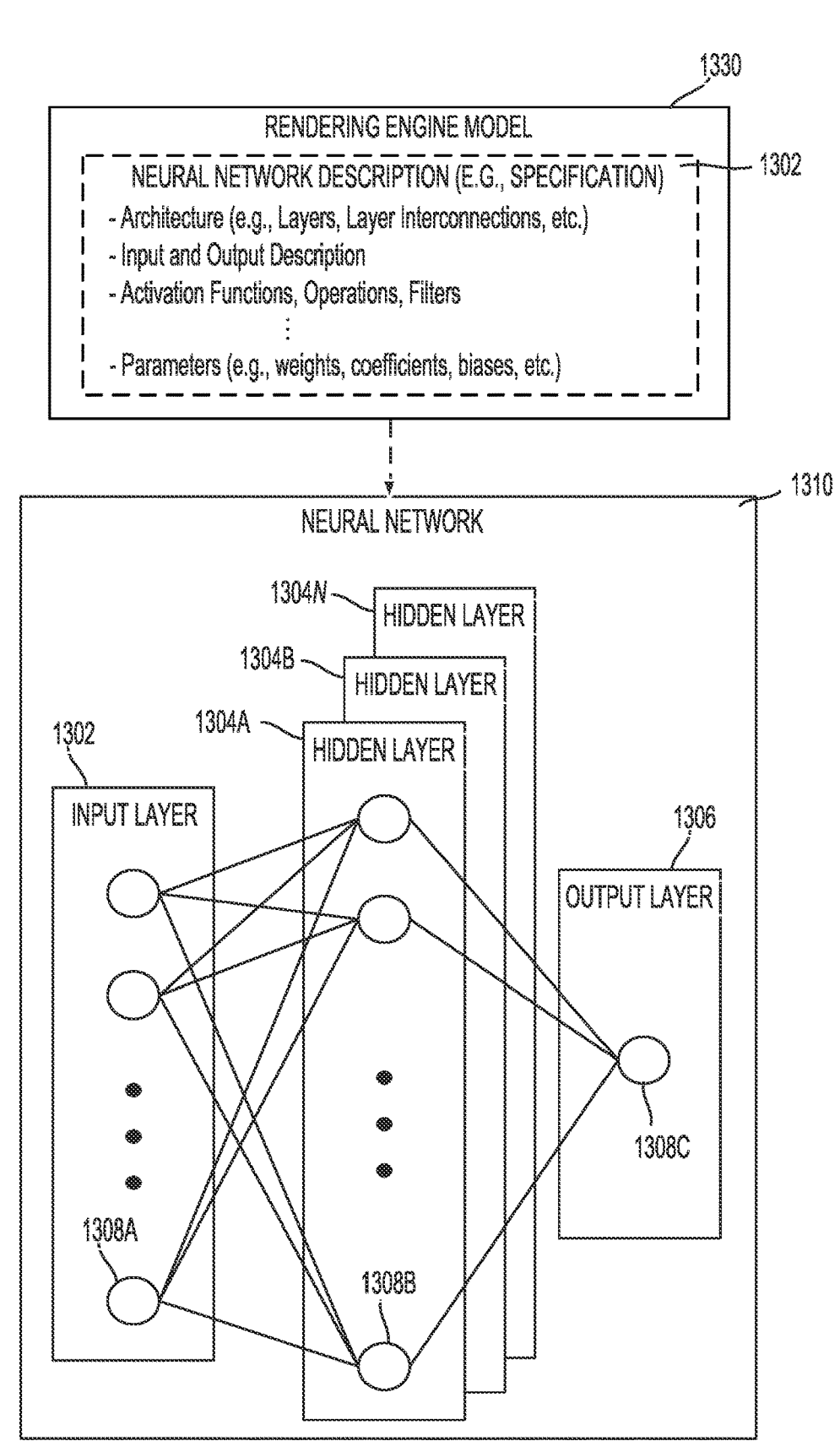
FIG. 13 illustrates an example neural network architecture, according to one aspect of the present disclosure.

FIG. 13 illustrates an example neural network architecture, according to one aspect of the present disclosure. Architecture 1300 includes a neural network 1310 defined by an example neural network description 1320 in rendering engine model (neural controller) 1330. The neural network 1310 can represent a neural network implementation of a rendering engine for rendering media data. The neural network description 1320 can include a full specification of the neural network 1310, including the neural network architecture 1300. For example, the neural network description 1320 can include a description or specification of the architecture 1300 of the neural network 1310 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 1310 reflects the architecture 1300 defined in the neural network description 1320. In this example, the neural network 1310 includes a neural network input layers $1302a$ through $1302n$ (collectively "1302" hereinafter), which includes input data, such as input layers as described in FIGS. 2 and 3. In one illustrative example, the input layers can include data representing a portion of the input media data such as a patch of data or pixels (e.g., a $128 \times 128$ patch of data) in an image corresponding to the input media data (e.g., that of input layers as described in FIGS. 2 and 3). For clarification, the term "input layer" as described in at least FIGS. 2 and 3 are different from the neural network input layers as described in FIG. 13.

The neural network 1310 includes neural network output layers $1306a$ through $1304n$ (collectively "1304" hereinafter). The neural network hidden layer 1304 can include n number of hidden layers, where n is an integer greater than or equal to one. The number of hidden layers can include as many layers as needed for a desired processing outcome and/or rendering intent. The neural network 1310 further includes an output layer that provides an output (e.g., computer-generated content) resulting from the processing performed by the hidden layers 1304. In one illustrative example, the neural network output layer 1306 can provide one or more output layers of the computer-generated content.

The neural network 1310 in this example is a multi-layer neural network of interconnected nodes. Each node can represent a piece of information. Information associated with the nodes is shared among the different layers and each layer retains information as information is processed. In some cases, the neural network 1310 can include a feed-forward neural network, in which case there are no feedback connections where outputs of the neural network are fed back into itself. In other cases, the neural network 1310 can include a recurrent neural network, which can have loops that allow information to be carried across nodes while reading in input.

Information can be exchanged between nodes through node-to-node interconnections between the various layers. Nodes 1308*a* of the neural network input layer 1302 can activate a set of nodes 1308*b* in the first neural network hidden layer 1304*a*. For example, as shown, each of the input nodes 1308*a* of the neural network input layer 1302*a* is connected to each of the nodes of the first neural network hidden layer 1304*a*. The nodes 1308*b* of the neural network hidden layer 1304*b* can transform the information of each input node by applying activation functions to the information. The information derived from the transformation can then be passed to and can activate the nodes of the next hidden layer (e.g., 1304*b*), which can perform their own designated functions. Example functions include convolutional, up-sampling, data transformation, pooling, and/or any other suitable functions. The output of the hidden layer (e.g., 1304*b*) can then activate nodes of the next hidden layer (e.g., 1304*n*), and so on. The output of the last hidden layer can activate one or more nodes of the neural network output layer 1306, at which point an output is provided. In some cases, while nodes (e.g., nodes 1308*a*, 1308*a*, 1308*c*) in the neural network 1310 are shown as having multiple output lines, a node has a single output and all lines shown as being output from a node represent the same output value.

In some cases, each node or interconnection between nodes can have a weight that is a set of parameters derived from training the neural network 1310. For example, an interconnection between nodes can represent a piece of information learned about the interconnected nodes. The interconnection can have a numeric weight that can be tuned (e.g., based on a training dataset), allowing the neural network 1310 to be adaptive to inputs and able to learn as more data is processed.

The neural network 1310 can be pre-trained to process the features from the data in the neural network input layer 1302 using the different neural network hidden layers 1304 in order to provide the output through the neural network output layer 1306. In an example in which the neural network 1310 is used to generate a computer-generated content, the neural network 1310 can be trained using training data that includes a diverse set of images covering a range of features and styles such that patterns, textures, structures are used as examples to generate novel images. For instance, training images can be input into the neural network 1310, which can be processed by the neural network 1310 to generate outputs which can be used to tune one or more aspects of the neural network 1310, such as weights, biases, etc.

In some cases, the neural network 1310 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 1310, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 1310 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 1310 can perform a backward pass by determining which inputs (weights) most contributed to the loss of the neural network 1310, and can adjust the weights so that the loss decreases and is eventually minimized.

A derivative of the loss with respect to the weights can be computed to determine the weights that contributed most to the loss of the neural network 1310. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 1310 can include any suitable neural or deep learning network. One example includes a convolutional neural network (CNN), which includes an input layer and an output layer, with multiple hidden layers between the input and output layers. The hidden layers of a CNN include a series of convolutional, nonlinear, pooling (for downsampling), and fully connected layers. In other examples, the neural network 1310 can represent any other neural or deep learning network, such as an autoencoder, a deep belief nets (DBNs), a recurrent neural networks (RNNs), etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:

storing one or more layers in memory, wherein the one or more layers are stored in relation to a content file;

receiving, from a client application of a content editing service, animation metadata pertaining to an animating element in a first layer of the one or more stored layers of the content file, wherein the animation metadata describes how the animating element is animated, wherein the first layer is a child layer of a second layer, and wherein the second layer includes an image-guided content generation modifier;

generating two or more animation frames of the content file based on the animation metadata;

applying the image-guided content generation modifier to the two or more animation frames in parallel to generate modified animation frames; and sending the modified animation frames to be displayed in a preview interface displayed alongside a canvas interface of the client application that contains the animating element, wherein the modified animation frames are presented as an animation.

2. The computer-implemented method of claim 1, wherein the modified animation frames are displayed as a continuous loop through the modified animation frames over a period of time.

3. The computer-implemented method of claim 1, wherein the two or more animation frames are at intermittent intervals and separated by interposed animation frames.

4. The computer-implemented method of claim 3, further comprising:

while the modified animation frames are displayed at the client application, modifying the interposed animation frames by applying the image-guided content generation modifier to the respective interposed animation frames in parallel; and after the modified interposed animation frames are generated, sending the modified interposed animation frames to replace temporary interposed animation frames interposed between the modified animation frames to display an updated animation at the client application.

5. The computer-implemented method of claim 4, further comprising:

using the animation metadata or the two or more animation frames to generate optical flow vectors; and using the optical flow vectors to generate the temporary interposed animation frames.

6. The computer-implemented method of claim 5, further comprising:

determining, based on the optical flow vectors, one or more regions in the two or more animation frames that do not have animation; and sending instructions to hold the regions in memory of a first modified animation frame throughout the animation.

7. The computer-implemented method of claim 5, further comprising:

determining, based on the optical flow vectors, one or more regions in the two or more animation frames that do not have animation; and generating a masked region of the respective animation frames that excludes the one or more regions, wherein the applying of the image-guided content generation modifier is to the masked region of the respective animation frames.

8. The computer-implemented method of claim 7, wherein the masked region is generated by using at least one of a transparency matte of the respective animation frames or an automatic image segmentation technique of the respective animation frames to automatically generate the masked region.

9. The computer-implemented method of claim 1, wherein the two or more animation frames are at intermittent intervals and separated by interposed animation frames, and wherein the generation of at least some of the two or more animation frames further comprises:

encoding animation data in pixels of the at least some of the two or more animation frames, wherein the animation data includes optical flow vectors generated based on the animation metadata; and sending the encoded animation data to the client application that uses the encoded animation data to create temporary interposed animation frames interposed between the modified animation frames for display in the animation while modified interposed animation frames are being generated.

10. The computer-implemented method of claim 1, wherein the content editing service is a collaborative content editing service.

11. The computer-implemented method of claim 1, further comprising:

applying the animation metadata to a shadow copy of the content file, wherein the two or more animation frames are generated from the shadow copy with the applied animation metadata.

12. The computer-implemented method of claim 11, wherein the shadow copy is stored with a collaboration service for real-time state synchronization.

13. The computer-implemented method of claim 1, wherein metadata of the one or more layers guides the image-guided content generation modifier to boost a control strength of one or more contours contiguous with a respective transparent background of the two or more animation frames.

14. The computer-implemented method of claim 1, wherein the modified animation frames includes a set of output layers corresponding to the one or more layers.

15. The computer-implemented method of claim 1, further comprising:

receiving a text prompt or contextual data to further guide the image-guided content generation modifier in generating the modified animation frames.

16. The computer-implemented method of claim 15, wherein the contextual data includes optical flow vector data that provides context to movement of one or more features of the two or more animation frames.

17. A computing device comprising:

one or more processors; and memory storing instructions that, when executed by the one or more processors, configure the computing device to:

store one or more layers in memory, wherein the one or more layers are stored in relation to a content file;

receive, from a client application of a content editing service, animation metadata pertaining to an animating element in a first layer of the one or more stored layers of the content file, wherein the animation metadata describes how the animating element is animated, wherein the first layer is a child layer of a second layer, and wherein the second layer includes an image-guided content generation modifier;

generate two or more animation frames of the content file based on the animation metadata;

apply the image-guided content generation modifier to the two or more animation frames in parallel to generate modified animation frames; and send the modified animation frames to be displayed in a preview interface displayed alongside a canvas interface of the client application that contains the animating element, wherein the modified animation frames are presented as an animation.

18. The computing device of claim 17, wherein the two or more animation frames are at intermittent intervals and separated by interposed animation frames.

19. A non-transitory computer-readable storage medium, the computer-readable storage medium including instructions that when executed by a computer, cause the computer to:

store one or more layers in memory, wherein the one or more layers are stored in relation to a content file;

receive, from a client application of a content editing service, animation metadata pertaining to an animating element in a first layer of the one or more stored layers of the content file, wherein the animation metadata describes how the animating element is animated, wherein the first layer is a child layer of a second layer, and wherein the second layer includes an image-guided content generation modifier;

generate two or more animation frames of the content file based on the animation metadata;

apply the image-guided content generation modifier to the two or more animation frames in parallel to generate modified animation frames; and send the modified animation frames to be displayed in a preview interface displayed alongside a canvas interface of the client application that contains the animating element, wherein the modified animation frames are presented as an animation.

20. The non-transitory computer-readable storage medium of claim 19, wherein the instructions, when executed by the computer, cause the computer to:

apply the animation metadata to a shadow copy of the content file, wherein the two or more animation frames are generated from the shadow copy with the applied animation metadata.

* * * * *